(12) United States Patent
Ziring et al.

(10) Patent No.: US 12,088,663 B2
(45) Date of Patent: *Sep. 10, 2024

(54) METHODS FOR DETERMINING SECOND SCREEN CONTENT BASED ON DATA EVENTS AT PRIMARY CONTENT OUTPUT DEVICE

(71) Applicant: Comcast Cable Communications, LLC, Philadelphia, PA (US)

(72) Inventors: Stephen Ziring, Lansdale, PA (US); David Nicholas Voyles, Narberth, PA (US); Kalila Sharafi, Philadelphia, PA (US); Charles White, Glen Mills, PA (US); Maurice Gaston, Philadelphia, PA (US); Bryan Yurasits, Levittown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,204

(22) Filed: Sep. 15, 2023

(65) Prior Publication Data
US 2024/0073279 A1    Feb. 29, 2024

Related U.S. Application Data

(63) Continuation of application No. 14/614,562, filed on Feb. 5, 2015, now Pat. No. 11,818,203.

(51) Int. Cl.
*G06Q 30/00* (2023.01)
*G06Q 30/0251* (2023.01)
(Continued)

(52) U.S. Cl.
CPC ....... *H04L 67/104* (2013.01); *G06Q 30/0255* (2013.01); *H04L 67/55* (2022.05)

(58) Field of Classification Search
CPC .......................... H04L 67/104; G06Q 30/0255
See application file for complete search history.

(56) References Cited

U.S. PATENT DOCUMENTS 6,330,665 B1    12/2001    Wise et al.
6,637,032 B1    10/2003    Feinleib
(Continued)

OTHER PUBLICATIONS

B. Satterwhite and O. Marques, "Automatic detection of TV commercials," in IEEE Potentials, vol. 23, No. 2, pp. 9-12, Apr.-May 2004, doi: 10.1109/MP.2004.1309790. (Year: 2004).*

(Continued)

*Primary Examiner* — Sun M Li
(74) *Attorney, Agent, or Firm* — Banner & Witcoff, Ltd.

(57) ABSTRACT

Aspects as described herein are directed to providing an enhanced user experience for consuming content on a computing device. Secondary computing devices, such as handheld smartphones and tablet-style computers, may be identified by a primary computing device, such as a set-top box. The secondary computing devices may be configured to receive actionable instructions from the primary computing device. An actionable event associated with content being outputted to a user via the primary computing device may be determined and an actionable instruction may be transmitted to the secondary computing device in response to the determined actionable event.

40 Claims, 17 Drawing Sheets

(51) Int. Cl.
*H04L 67/104* (2022.01)
*H04L 67/55* (2022.01)

(56) References Cited

U.S. PATENT DOCUMENTS

| | | | |
|---|---|---|---|
| 6,871,006 B1 | 3/2005 | Oguz et al. |
| 6,970,641 B1 | 11/2005 | Pierre et al. |
| 7,017,173 B1 | 3/2006 | Armstrong et al. |
| 7,043,746 B2 | 5/2006 | Ma |
| 7,073,189 B2 | 7/2006 | McElhatten et al. |
| 7,114,173 B2 | 9/2006 | Urdang et al. |
| 7,231,132 B1 | 6/2007 | Davenport |
| 7,274,857 B2 | 9/2007 | Nallur et al. |
| 7,280,156 B2 | 10/2007 | Roelens |
| 7,293,278 B2 | 11/2007 | Michel |
| 7,305,442 B1 | 12/2007 | Lundy |
| 7,317,797 B2 | 1/2008 | Vince |
| 7,317,866 B1 | 1/2008 | Adolph et al. |
| 7,330,640 B2 | 2/2008 | Schultz et al. |
| 7,334,251 B2 | 2/2008 | Rodriguez et al. |
| 7,379,656 B2 | 5/2008 | Lin et al. |
| 7,383,565 B1 | 6/2008 | Fakharzadeh |
| 7,412,149 B2 | 8/2008 | Cohen et al. |
| 7,720,432 B1 | 5/2010 | Colby et al. |
| 7,746,223 B2 | 6/2010 | Howarter et al. |
| 8,307,390 B2 | 11/2012 | Holden |
| 8,350,694 B1 | 1/2013 | Trundle et al. |
| 8,676,995 B1 | 3/2014 | Andreasen et al. |
| 8,774,607 B2 | 7/2014 | Holden |
| 9,055,320 B2 | 6/2015 | Bhogal et al. |
| 9,106,975 B1 | 8/2015 | Gildfind et al. |
| 9,258,593 B1 | 2/2016 | Chen et al. |
| 9,282,381 B2 | 3/2016 | Dhruv et al. |
| 9,389,745 B1 | 7/2016 | Leatham |
| 9,420,326 B1 | 8/2016 | Kessler et al. |
| 9,426,519 B1 | 8/2016 | Lewis et al. |
| 9,516,374 B2 | 12/2016 | Cormican et al. |
| 9,697,295 B1* | 7/2017 | Nijim | H04N 21/23424 |
| 9,769,539 B2 | 9/2017 | Bhogal et al. |
| 10,327,026 B1 | 6/2019 | Mishra |
| 11,159,484 B2 | 10/2021 | Baum et al. |
| 2002/0144262 A1 | 10/2002 | Plotnick et al. |
| 2002/0199009 A1 | 12/2002 | Willner et al. |
| 2003/0154128 A1 | 8/2003 | Liga et al. |
| 2004/0034874 A1 | 2/2004 | Hord et al. |
| 2004/0103429 A1 | 5/2004 | Carlucci et al. |
| 2004/0133909 A1 | 7/2004 | Ma |
| 2005/0216932 A1 | 9/2005 | Danker |
| 2006/0080167 A1 | 4/2006 | Chen et al. |
| 2006/0155851 A1 | 7/2006 | Ma et al. |
| 2006/0218602 A1 | 9/2006 | Sherer et al. |
| 2007/0157072 A1 | 7/2007 | LaBiche |
| 2007/0157237 A1 | 7/2007 | Cordray et al. |
| 2007/0204310 A1 | 8/2007 | Hua et al. |
| 2007/0239546 A1 | 10/2007 | Blum et al. |
| 2007/0294292 A1 | 12/2007 | Hydrie et al. |
| 2008/0040740 A1 | 2/2008 | Plotnick et al. |
| 2008/0077483 A1 | 3/2008 | Hollo et al. |
| 2008/0155585 A1 | 6/2008 | Craner et al. |
| 2008/0255943 A1 | 10/2008 | Morten et al. |
| 2008/0276266 A1* | 11/2008 | Huchital | H04N 21/8133 |
| | | | 725/32 |
| 2008/0304809 A1 | 12/2008 | Haberman |
| 2008/0310305 A1 | 12/2008 | Lee |
| 2008/0313668 A1 | 12/2008 | Setos |
| 2009/0031419 A1 | 1/2009 | Laksono |
| 2009/0049186 A1 | 2/2009 | Agnihotri et al. |
| 2009/0150966 A1 | 6/2009 | Alao et al. |
| 2009/0222854 A1 | 9/2009 | Cansler et al. |
| 2009/0244371 A1 | 10/2009 | Park |
| 2010/0005488 A1 | 1/2010 | Rakib et al. |
| 2010/0077435 A1 | 3/2010 | Kandekar et al. |
| 2010/0218208 A1 | 8/2010 | Holden |
| 2010/0251288 A1 | 9/2010 | Carlucci et al. |
| 2010/0290761 A1 | 11/2010 | Drake et al. |
| 2010/0325660 A1 | 12/2010 | Holden |
| 2011/0103763 A1 | 5/2011 | Tse et al. |
| 2011/0162018 A1 | 6/2011 | Dodd |
| 2011/0200304 A1 | 8/2011 | Rutledge |
| 2011/0219400 A1 | 9/2011 | Candelore et al. |
| 2011/0258548 A1 | 10/2011 | Abujbara et al. |
| 2011/0274405 A1 | 11/2011 | Godar |
| 2011/0289531 A1 | 11/2011 | Moonka et al. |
| 2012/0042344 A1 | 2/2012 | Pan et al. |
| 2012/0054020 A1 | 3/2012 | Jacobs |
| 2012/0081615 A1 | 4/2012 | Starr et al. |
| 2012/0114305 A1 | 5/2012 | Holden |
| 2012/0162537 A1 | 6/2012 | Maddali et al. |
| 2012/0185895 A1 | 7/2012 | Wong et al. |
| 2013/0014158 A1 | 1/2013 | Bhatia et al. |
| 2013/0311670 A1 | 11/2013 | Tarbox et al. |
| 2014/0119709 A1 | 5/2014 | Sardera |
| 2014/0167929 A1 | 6/2014 | Shim et al. |
| 2014/0186007 A1* | 7/2014 | Keys | H04N 21/4223 |
| | | | 386/234 |
| 2014/0201767 A1 | 7/2014 | Seiden et al. |
| 2014/0259056 A1 | 9/2014 | Grusd |
| 2014/0280564 A1 | 9/2014 | Darling et al. |
| 2014/0282653 A1 | 9/2014 | Ariantaj et al. |
| 2014/0282662 A1 | 9/2014 | Major |
| 2014/0282693 A1 | 9/2014 | Soundararajan et al. |
| 2014/0282735 A1 | 9/2014 | Davis et al. |
| 2014/0321826 A1 | 10/2014 | Stelmack et al. |
| 2014/0351860 A1 | 11/2014 | Chen et al. |
| 2014/0373074 A1* | 12/2014 | Hwang | H04N 21/47214 |
| | | | 725/56 |
| 2015/0020127 A1 | 1/2015 | Doshi et al. |
| 2015/0026728 A1 | 1/2015 | Carter et al. |
| 2015/0062343 A1 | 3/2015 | Hwang et al. |
| 2015/0063790 A1 | 3/2015 | Rodriguez et al. |
| 2015/0067714 A1 | 3/2015 | Bhogal et al. |
| 2015/0172742 A1 | 6/2015 | Richardson |
| 2015/0319506 A1 | 11/2015 | Kansara et al. |
| 2016/0019017 A1 | 1/2016 | Walker et al. |
| 2016/0080829 A1* | 3/2016 | Biber | H04N 21/47217 |
| | | | 725/32 |
| 2016/0127800 A1 | 5/2016 | Weast |
| 2016/0234295 A1 | 8/2016 | Ziring et al. |
| 2017/0099592 A1 | 4/2017 | Loeb et al. |
| 2017/0188116 A1 | 6/2017 | Major et al. |
| 2017/0208369 A1 | 7/2017 | Major et al. |
| 2019/0034975 A1* | 1/2019 | Rizk | G06F 3/0482 |

OTHER PUBLICATIONS

P. R. Wilson, V. G. Oziyani and N. Ventura, "Monetizing IMS-based IPTV through personalized advertising," 2009 International Conference on Ultra Modern Telecommunications & Workshops, St. Petersburg, Russia, 2009, pp. 1-7, doi: 10.1109/ICUMT.2009.5345437. (Year: 2009).*

D. Isović, "Real-time media processing in embedded consumer electronic devices," 2009 XXII International Symposium on Information, Communication and Automation Technologies, Sarajevo, Bosnia and Herzegovina, 2009, pp. 1-10, doi: 10.1109/ICAT.2009.5348440. (Year: 2009).*

Internet Advertising: An Interplay among Advertisers, Online Publishers, Ad Exchanges and Web Users Shuai Yuan, Ahmad Zainal Abidin, Marc Sloan, Jun Wang. arXiv:1206.1754v2 [cs.IR] Jul. 2, 2012 (Year: 2012) (Year: 2012).*

European Search Report for EP10154144 dated May 7, 2010.

Magna Global Updates On-Demand Forecasts, Radio Business Report/Television Business Report—Voice of the Broadcasting Industry, pp. 1-3, <http://www.rbr.com/media-news/advertising/magna_global_updates_on-demand_forecasts.html>, printed Feb. 12, 2009.

King of Beers Defies TiVo Timeshifting, Television Broadcast magazine, Jan. 2008, pp. 1-2, <http://www.televisionbroadcast.com/article/73266>, printed Feb. 12, 2009.

Study: DVR Ratings Impact Rises, Steve McClellan, Adweek, Nov. 6, 2008, pp. 1-2, <http://www.adweek.com/aw/content_display/news/agency/e3i3def5863518ec8fbe78bc3264662ca35>, printed Feb. 12, 2009.

(56) References Cited

OTHER PUBLICATIONS

Report: More Than Half of $100K Households Time Shift, by Anthony Crupi, Mediaweek, Jan. 8, 2009, pp. 1-2, <http://www.mediaweek.com/mw/content_display/news/media-agencies-research/e3i41ac0111ebdf301046d725505e8812e5, printed Feb. 12, 2009.

Fox Goes Sci-Fi to Measure 'Fringe' Ad Effectiveness, by Jon Lafayette, TVWeek, Sep. 7, 2008, pp. 1-4, <http://www.tvweek.com/news/2008/09/fix_goes_scifi_to_measure_frin.php>, printed Feb. 12, 2009.

Trick-File Advertising, by Dan Holden, presentation at NCTA 2009, Mar. 2009.

Targeting Advertising: Cable Show Tech Session Review, Cable 360 Net, www.cablefax.com, Apr. 6, 2009.

Cable Show 2009: Sending the Right Message, Multichannel News, www.multichannel.com, Apr. 1, 2009.

Communication in EP10154144.9 dated Jun. 1, 2011.

EP Extended Search Report in corresponding Application No. 11178368.4; dated Feb. 5, 2012.

Response to Office Action in related Canadian case—CA 2,693,708.

Canadian Office Action in CA 2,748,785 dated Jun. 16, 2017.

Jun. 13, 2018—Canadian Office Action—CA 2,748,785.

\* cited by examiner

| Actionable Event | Actionable Instruction #1 | Actionable Instruction #2 |
|---|---|---|
| Incoming Call | Lighting Instruction | Identification Instruction |
| Pause Command | Pause Instruction | |
| Fast Forward Command | Rate of Speed Instruction | Permit/Deny Instruction |
| Play Command | Play Instruction | Content Location Instruction |
| Record Command | Record Instruction | |
| Channel Change | Channel ID Instruction | |
| Rewind Command | Rewind Instruction | Rate of Speed Instruction |
| Commerical Marker | Commercial Identification | Advertisement Instruction |
| Object Identifier | Object Identifer Instruction | Advertisement Instruction |
| Viewer Leaving | Pause Instruction | |
| Viewer Leaving | Switch Primary Content Instruction | Advertisement Instruction |
| Garage Door Opening | Pause Instruction | Security Camera Instruction |
| Television Turn Off Command | Turn Off Instruction | |

FIG. 4

METHODS FOR DETERMINING SECOND SCREEN CONTENT BASED ON DATA EVENTS AT PRIMARY CONTENT OUTPUT DEVICE

CROSS-REFERENCE TO RELATED APPLICATIONS

This application is a continuation of and claims priority to U.S. patent application Ser. No. 14/614,562, filed Feb. 5, 2015, which is hereby incorporated by reference in its entirety.

BACKGROUND

Users consume content in a variety of manners and utilizing a variety of different resources. In the television industry, service providers have developed programming guides, content recording devices, and video on demand services to allow a user to experience more from the service provider. Accordingly, service providers are looking to enhance a user's experience while consuming content.

SUMMARY

This summary is not intended to identify critical or essential features of the disclosures herein, but instead merely summarizes certain features and variations thereof. Other details and features will also be described in the sections that follow.

Aspects described herein are directed to various manners, devices, and systems for enhancing a user experience while consuming content. Secondary devices and/or systems are described to be configured to receive transmitted actionable instructions. Such actionable instructions are described to be a specific instruction to perform a task, such as to raise the lighting in a room of a house or to output a particular type of content on a secondary device, and/or are described to be informational in nature so that the secondary device performs a task, such as a fast forward instruction and the secondary device responds by preventing fast forwarding through an advertisement on the secondary device or a pause instruction and the secondary device runs an advertisement about an individual included in the paused frame of content on the primary device. Actionable events, such as a commercial break marker in video programming content, are described to be determined and correlated to an actionable instruction to be transmitted.

According to further aspects as described herein, a method, system, software, and/or apparatus are described to be provided for, e.g., controlling a second screen experience of a user when a fast forwarding instructions is initiated. A first computing device are described to receive an identifier of a fast forward instruction to fast forward through a first advertisement in video programming content received at a second computing device. The identifier is described to be received from the second computing device and the identifier is described to include data representative of a rate of speed of the fast forward instruction. Based upon the rate of speed of the fast forward instruction, a second advertisement is described to be determined to output on the first computing device, and the second advertisement is described to be outputted in accordance with the rate of speed of the fast forward instruction.

According to further aspects as described herein, a method, software, and/or apparatus are described to be provided for, e.g., swapping the locations of advertisements during a second screen experience. A first computing device is described to receive an identifier of an instruction to change a first set of advertisements in video programming content received at a second computing device to a second set of advertisements for output on the first computing device. The identifier is described to be received from the second computing device. The second set of advertisements to output on the second computing device is described to be determined based upon the instruction to change, and the second set of advertisements is described to be outputted on the first computing device.

According to further aspects as described herein, a method, system, software, and/or apparatus are described to be provided for, e.g., controlling the ability of fast forwarding through content. A first computing device is described to receive a fast forward instruction to fast forward through a first advertisement in video programming content received at the first computing device. Upon determining that a second computing device, external to the first computing device, is in operation to display an alternative advertisement on the second computing device, the fast forwarding through the first advertisement is described to be permitted and an actionable instruction to the second computing device to output the alternative advertisement are described to be transmitted.

According to further aspects as described herein, a method, system, software, and/or apparatus are described to be provided for logging into a second screen experience for a program without presenting the programming content on a first computing device. A first computing device is described to receive data representative of a user logging into a program on a second computing device that interacts with the first computing device. Such a second computing device is described to be external to the first computing device. Responsive to a determination that the first computing device is not receiving video programming content, a receiver of the first computing device automatically is described to tune to receive video programming content, and an actionable instruction is described to be transmitted to the second computing device identifying the television programming content being received by the first computing device.

According to further aspects as described herein, a method, system, software, and/or apparatus are described for, e.g., synchronizing later play of content to a second screen experience. A first computing device may receive an identifier of an actionable instruction to play previously recorded primary content at a second computing device. The identifier may be received form the second computing device. Secondary content to output on the second computing device based upon the actionable instruction may be determined, and the secondary content may be outputted on the first computing device.

According to further aspects as described herein, a method, system, software, and/or apparatus may be provided for, e.g., determining secondary content based upon the context of primary content. A first computing device may receive primary content, such an episode of video programming content. Secondary content to be outputted by a second computing device based upon an identification of the primary content may be determined. Such a determination may be that the secondary content should be an advertisement for a later episode of video programming content. An actionable instruction may be transmitted to the second computing device to configure the second computing device to output the determined secondary content.

According to further aspects as described herein, a method, system, software, and/or apparatus may be provided for, e.g., dynamic advertising. A first computing device may receive primary content, such as a live sporting event. Secondary content to be determined by a second computing device based upon an object in the primary content may be determined. Such an example may be a car being shown in the live sporting event and the secondary content may be an advertisement by the manufacturer of the car. An actionable instruction may be transmitted to the second computing device to configure the second computing device to output the determined secondary content. In this example, the second computing device may output the car advertisement as a second screen experience to a user.

According to further aspects as described herein, a method, system, software, and/or apparatus may be provided for, e.g., bookmarking a portion of video programming content for use in a second screen environment. In one example, the portion is less than an entire video programming content. A first computing device may receive an identifier of video programming content being outputted on a second computing device, and may receive an input to bookmark a portion of the video programming content. Data representative of the bookmark may be stored on the first computing device, and an instruction to output the video programming content from the bookmark may be received. The bookmarked portion of the video programming content may be outputted by the first computing device to the second computing device. The second computing device may correlate a second screen experience with the bookmarked portion.

For example, video programming content may be 30 minutes in length. As understood, the entire 30 minute period, with commercials and/or other promotions included, would be the video programming content. The video programming content may be a home improvement television program. A viewer may be watching the home improvement television program utilizing a home set-top box that includes a digital video recorder. While watching the program, the viewer may desire to bookmark a portion of the program, such as a 10 minute span dealing with a particular home improvement project of interest to the viewer. Accordingly, the viewer may send an instruction to the set-top box to bookmark the video programming content. This may include an identifier where the viewer must rewind to start the bookmark location and then enter an end to the bookmark location, or an identifier where the viewer bookmarks a current spot and the set-top box identifies a beginning and end portion, whether in response to the viewer instructions, operation of the computing device (e.g., set-top box), and/or the video programming content. For example, bookmarking may be done by bookmarking since the last commercial and up until the next commercial, bookmarking the previous five minutes and next five minutes, and/or bookmarking the next ten minutes starting from the receipt of the viewer instruction. In still other examples, a video programming content itself may be identified by portions and receipt of an instruction to bookmark may include bookmarking the identified portion. For example, a 30 minute television program may be identified as three portions, whether each being 10 minutes, each being different amounts of time, or two being the same amount of time and one being different. If a user instructs to bookmark the video programming content while portion two is being viewed, the system may identify the portion number two as the bookmarked portion of video programming content.

Accordingly, the bookmarked portion may be sent to the second computing device, e.g., tablet-style computer, of the viewer. A second screen experience of the viewer may be correlated to the portion. For example, the second screen experience of the viewer that occurred during the bookmarked portion may be concurrently outputted to the viewer with the bookmarked portion being played. For example, the viewer may walk to her bathroom to attempt the home repair being shown in the bookmarked second portion of the video programming content. The second screen experience may involve showing a similar video with a more direct view of the area being repaired. Therefore the viewer can watch and/or listen to the bookmarked portion of video programming content on her tablet-style computer while also watching and/or listening to the additional second screen experience that was similarly occurring. The second computer need not receive the content associated with the second screen experience from the first computing device. Knowing the bookmarked portion of video programming content, the second computing device separately may retrieve the second screen content from an external source, may retrieve the second screen content from a locally stored recording of the second screen content that occurred during original output of the video programming content, and/or a combination of local and remote access.

According to further aspects as described herein, a method, system, software, and/or apparatus may be provided for, e.g., identifying a particular device to utilize for a second screen experience. A first computing device may receive an actionable instruction to be initiated by the first computing device. Such an instruction may a trick play operation on video programming content on a second computing device, such as a set-top box. The second computing device that transmitted the actionable instruction may be determined among a plurality of computing devices. The video programming content being received at the second computing device may be determined, and content may be outputted on the first computing device based upon the determined video programming content.

The foregoing methods and other methods described herein may be performed by a system, a computing device, a computer readable medium storing computer-executable instructions for performing the methods, and/or an apparatus having a processor and memory storing computer-executable instructions for performing the methods.

BRIEF DESCRIPTION OF THE DRAWINGS

Some features herein are illustrated by way of example, and not by way of limitation, in the figures of the accompanying drawings and in which like reference numerals refer to similar elements.

FIG. 4 illustrates an example table to correlate actionable events to actionable instructions according to one or more illustrative aspects of the disclosure.

DETAILED DESCRIPTION

In the following description of various illustrative examples, reference is made to the accompanying drawings, which form a part hereof, and in which is shown, by way of illustration, various examples in which aspects of the disclosure may be practiced. It is to be understood that other examples may be utilized, and structural and functional modifications may be made, without departing from the scope of the present disclosure.

Figure 1:
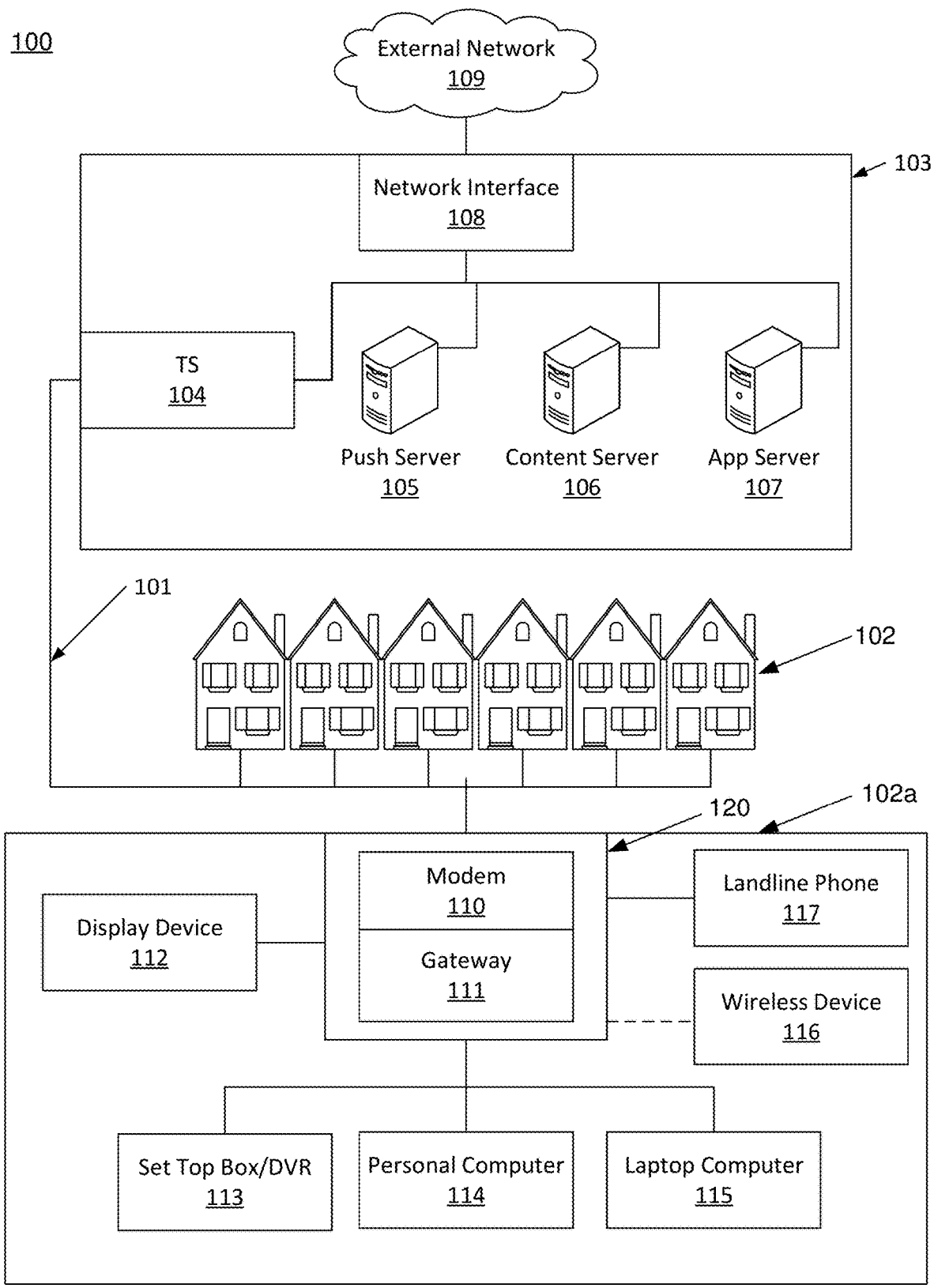
FIG. 1 illustrates an example communication network on which various features described herein may be used.

FIG. 1 illustrates an example communication network 100 on which some or all of the various features described herein may be implemented. The network 100 may be any type of information distribution network, such as satellite, telephone, cellular, wireless, etc. One example may be an optical fiber network, a coaxial cable network, and/or a hybrid fiber/coax distribution network. The network 100 also may include multiple types of networks (e.g., Wi-Fi 802.11a-n, Ethernet, 3G, 4G, and 4GLTE) that interconnect. Such networks 100 use a series of interconnected communication links 101 (e.g., coaxial cables, optical fibers, wireless, etc.) to connect multiple premises 102 (e.g., businesses, homes, consumer dwellings, etc.) to a local office or head end 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Still another application server 107 may be responsible for tracking and collecting billing data associated with various premises 102 equipment. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway device 111, such as a gateway interface device. The modem 110 may be connected to, or be a part of, the gateway device 111. The gateway device 111 may be a computing device that communicates with the modem(s) 110 to allow one or more other devices in the premises 102a, to communicate with the local office 103 and other devices beyond the local office 103. The gateway device 111 may be a set-top box (STB), digital video recorder (DVR), computer server, or any other desired computing device. The gateway device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
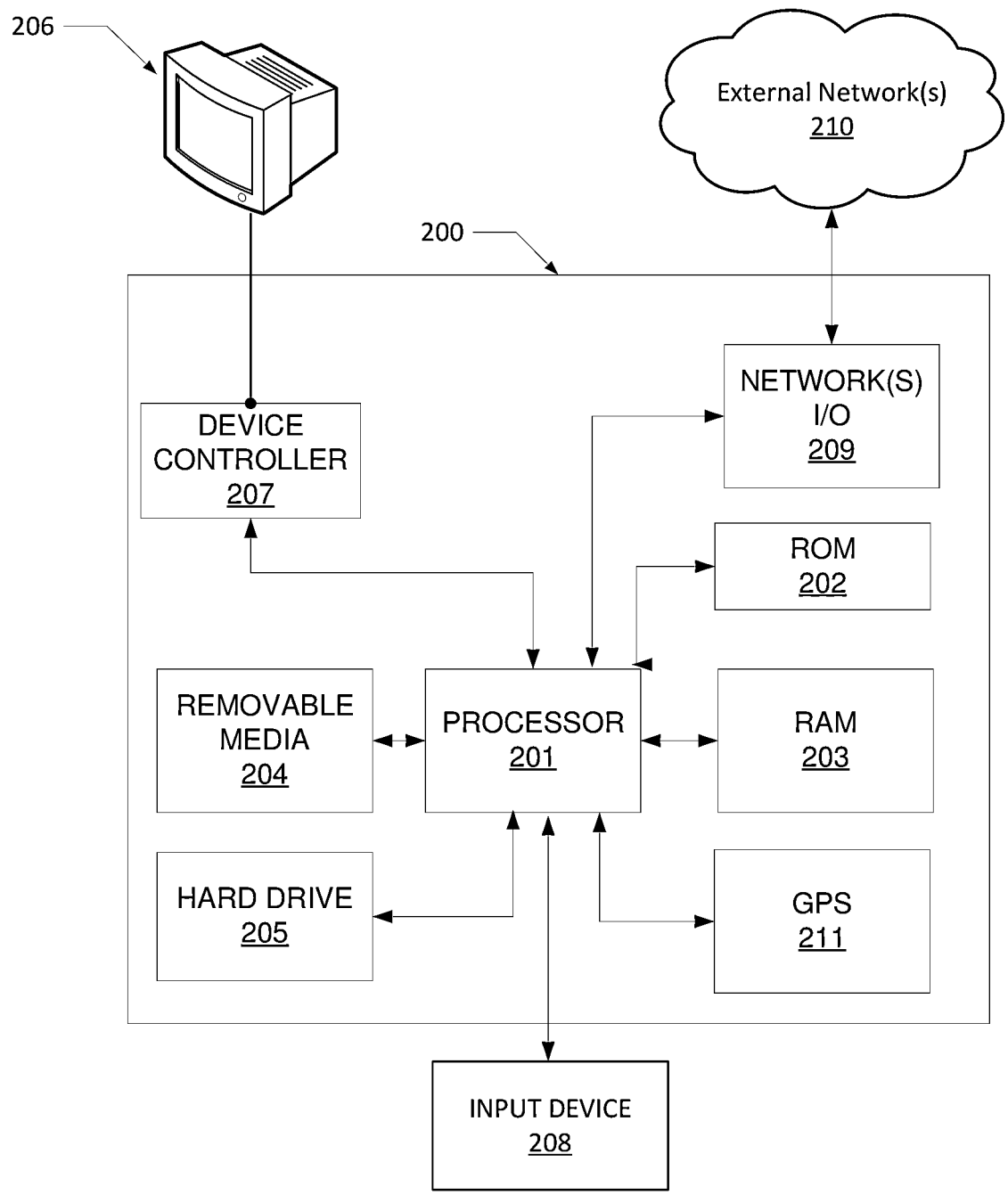
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network I/O circuit 209 may be a wired interface, wireless interface, or a combination of the two. In some examples, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
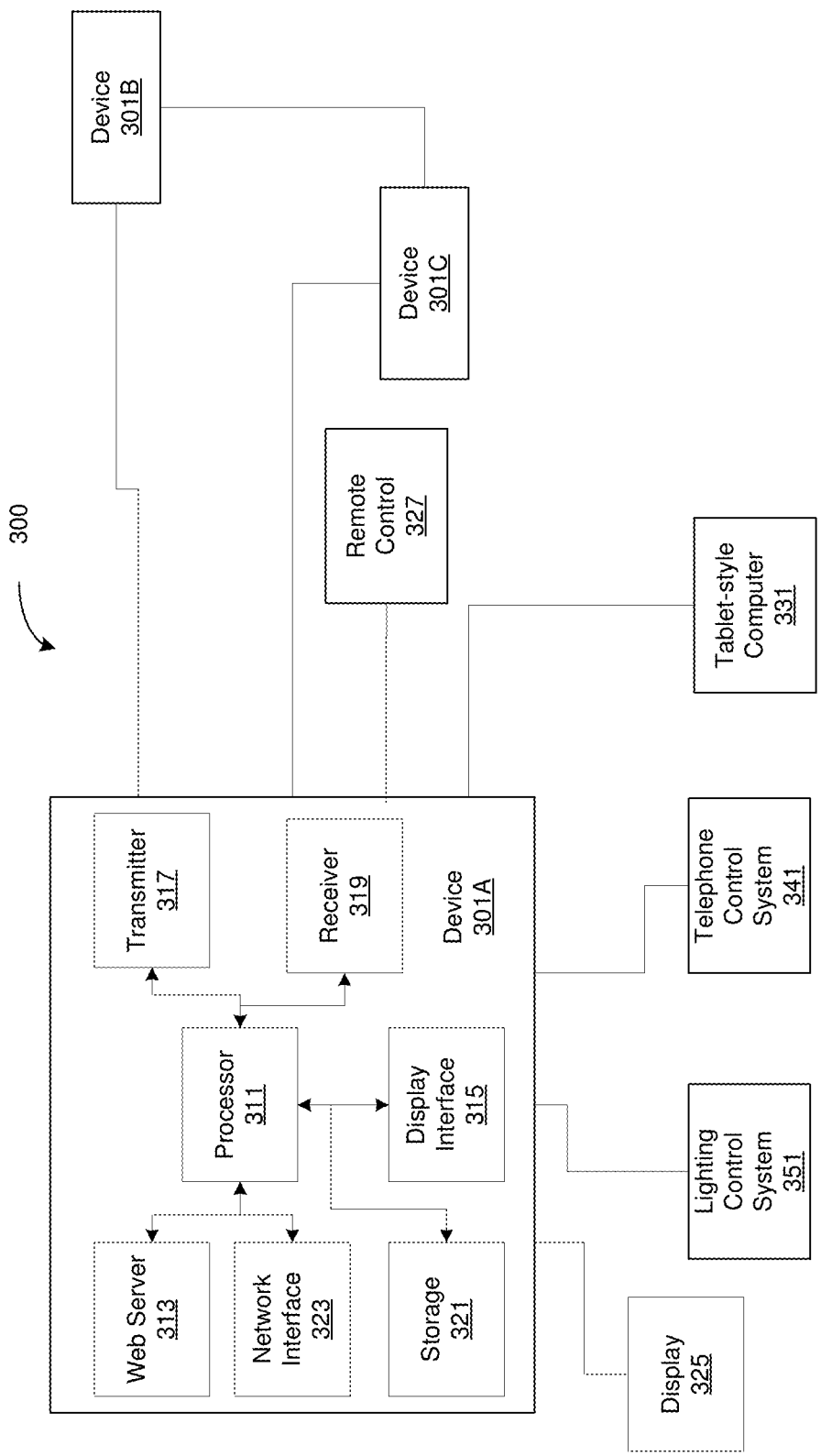
FIG. 3 illustrates an example system of devices for enhancing a user experience according to one or more illustrative aspects of the disclosure.

FIG. 3 illustrates an example system 300 of devices for enhancing a user experience in consuming content. Shown is a computing device 301A for transmitting and receiving data. Computing device 301A may be a gateway, such as gateway device 111, a set-top box, such as set-top box 113, a digital video recorder, and/or other computing device, such as computing device 200. Although the examples included herein describe a cable system where a user desires to access audio and/or video content from a cable head end of the cable service provider network, aspects of the present disclosure described herein may be utilized in other configurations and/or computing environments.

Computing device 301A includes a processor 311. The processor 311 may be configured to execute computer readable instructions maintained in a memory storage 321 and/or accessed from a remote location, such as via a network interface 323. The processor 311 may be configured to execute commands for computing device 301A to receive inputs and transmit outputs. The device 301A may be configured to output content, such as video programming content, to a display 325 via a display interface 315. The display 325 may be an external television, and display interface 315 may include one or more output device controllers, such as output device controller 207. In some examples, display 325 may be a two way interface device that can receive user inputs. In such examples, display interface 315 may be configured to transmit data to display 325 and receive data form display 325.

The memory storage 321 may comprise computer readable instructions and other data. For example, instructions and data may be stored in a read-only memory (ROM), such as ROM 202, a random access memory (RAM), such as RAM 203, a removable media, such as removable media 204, or any other desired storage medium. Instructions and data may also be stored in an attached (or internal) hard drive, such as hard drive 205. As described herein, computing device 301A may access a table that correlates actionable events with one or more actionable instructions. Such a table may be maintained by the computing device 301A in memory storage 321 and/or via a network interface 323.

The computing device 301A may include a network interface 323. Illustrative examples of network interface 323 include an Ethernet communication interface, a Wi-Fi communication interface, a USB communication interface, a MoCA communication interface, a Bluetooth communication interface, a 4G communication interface, and a DOCSIS communication interface. Other network interface(s) may include an 802.11ad (Wi-Fi in 60G spectrum) communication interface, other telecom network interfaces (e.g., edge network, 3G, 4GLTE), fiber optical interface technologies (e.g., Fiber Distributed Data Interface (FDDI), an 802.3 network interface, an 802.11au network interface, and an 802.11ae network interface. Other types of network interfaces to a type of network are included herein. One or more network interfaces may be physical interfaces, logical interfaces, and/or a combination of them.

In the illustrative example of FIG. 3, computing device 301A is shown to include a web server 313. Web server 313 may be configured to provide information obtained from processor 311, network interface 323, memory storage 321, display interface 315, and/or receiver 319, to one or more other computing devices, such as tablet-style computer 331. Utilizing transmitter 317, web server 313 may implement IEEE 802.11 standards to interface with other computing devices. Other communication protocols and/or standards may be utilized as well in accordance with the disclosure herein. Communication between web server 313 and other computing devices, such as tablet-style computer 331 may occur by way of a user's home network, e.g., a LAN, by some type of direct connection, and/or by way of some other type communication connection system. As certain data is identified, received, and/or detected, web server 313 may be configured to take the data and transmit an identifier of the data to the one or more computing devices. Web server 313 may include various communication protocols to manage the security of message transmissions over a network. The protocols may include a transmission control protocol (TCP), a hypertext transfer protocol (HTTP), internet protocol version 4 (IPV4) or version 6 (IPV6), and a secure sockets layer (SSL). Web server 313 also may utilize other communication methods including, but not limited to, ASP, Java, JavaScript, Flash, XML, and AJAX.

As described herein, web server 313 may be configured to transmit actionable instructions to one or more computing devices, such as tablet-style computer 331. An illustrative example of a tablet-style computer is an iPad by Apple Corporation. A program, such as a downloadable application, on the tablet-style computer 331, may receive data transmitted by the web server 313 from computing device 301A. Actionable instructions transmitted from computing device 301A may cause the tablet-style computer to perform one or more operations in response. An actionable instruction may be data of any of a number of forms or types. For example, an actionable instruction may be a specific task for the tablet-style computer 331 to implement, such as an instruction to output a specific advertisement on the tablet-style computer 331. In another example, an actionable instruction may be an identifier of general information, such as a channel number for video programming content being outputted on display 325, a pause command being received via a remote control 327 associated with the computing device 301A, an identifier of an incoming telephone call, or an identifier of a channel change operation.

Web server 313 may transmit actionable instructions via transmitter 317. In some examples, an actionable instruction may be the data received regarding the actionable event. For example, web server 313 may receive, via receiver 319, a command from a remote control 327 associated with the computing device 301A, such as pause, play, fast forward, and bookmark, and the web server may transmit, via transmitter 317, a confirmation (for example, with an identifier) that the command was received. Other examples include a command to retrieve similar programming content on a second computing device, identification of the visual focus of a viewer with respect to a display associated with the first computing device, a command to loop back and output a period of time of recently displayed content (e.g., a replay of the last 10 seconds of content) on a second computing device, etc. In other examples, web server 313 may be configured to receive data representative of an actionable event and correlate that data to one or more actionable instructions.

FIG. 4 illustrates an example table 400 to correlate actionable events to actionable instructions. Table 400 may be maintained in a memory storage of a computing device, such as memory storage 321 of computing device 301A, and/or accessed via a network interface, such as network interface 323 in computing device 301A.

Upon receipt of data regarding an actionable event, web server 313 may access table 400 in order to identify one or more actionable instructions (columns 403 and 405) to transmit to one or more computing devices. Table 400 may include actionable events (column 401) that correlate to inputs received from a remote control associated with the computing device 301A, such as remote control 327. Illustrative examples are a pause command (row 413), a fast forward command (row 415), a play command (row 417), a record command (row 419), a rewind command (row 421), a channel change indicator (row 423), an object identifier (row 427), and a television turn off command (row 435). In one example, if a user inputs a pause command into a remote control 327 associated with the computing device 301A, web server 313 may receive data regarding the pause command, which is an actionable event (row 413). Accessing table 400, web server 313 may identify a corresponding first actionable instruction in column 403 of a pause instruction. Then web server 313 may transmit, via transmitter 317, the identified actionable instruction of a pause instruction. Accordingly, a second screen device that receives the pause instruction (actionable instruction in column 403/row 413) may use the instruction to perform some action such as to pause the second screen content and/or to show an advertisement on the second screen device.

In another example, if a user inputs a fast forward command into a remote control 327 associated with the computing device 301A, web server 313 may receive data regarding the fast forward command, which is an actionable event (row 415). Accessing table 400, web server 313 may identify a corresponding first actionable instruction in column 403 of a rate of speed instruction and, in this example, a second actionable instruction in column 405 of a permit or deny instruction. Then web server 313 may transmit, via transmitter 317, one or more of the identified actionable instructions. In still other examples, if a user inputs a play command into a remote control 327 associated with the computing device 301A, web server 313 may receive data regarding the play command, an actionable event (row 417). Accessing table 400, web server 313 may identify a corresponding first actionable instruction in column 403 of a play instruction and, in this example, a second actionable instruction in column 405 of a content location instruction. Then web server 313 may transmit, via transmitter 317, one or more of the identified actionable instructions. Accordingly, a second screen device that receives the play instruction (actionable instruction in column 403/row 417) may use the instruction to perform some action such as to play the second screen content, and/or a second screen device that receives the content location instruction (actionable instruction in column 405/row 417) may use the instruction to perform some action such as to identify where the second screen device may locate the second screen content.

In an example, if a user inputs a record command into a remote control 327 associated with the computing device 301A, web server 313 may receive data regarding the record command, an actionable event (row 419). Accessing table 400, web server 313 may identify a corresponding first actionable instruction in column 403 of a record instruction. Then web server 313 may transmit, via transmitter 317, the identified actionable instruction. Accordingly, a second screen device that receives the actionable record instruction may record the second screen content in response to receipt of the record instruction. In still other examples, if a user inputs a channel change command into a remote control 327 associated with the computing device 301A, web server 313 may receive data regarding the channel change command, an actionable event (row 421). Accessing table 400, web server 313 may identify a corresponding first actionable instruction in column 403 of a channel ID instruction. Then web server 313 may transmit, via transmitter 317, the identified actionable instruction. Accordingly, a second screen device that receives the channel ID instruction (actionable instruction in column 403/row 421) may use the instruction to perform some action such as to switch to second screen content associated with the channel ID included in the channel ID instruction.

According to additional examples, if a user inputs a rewind command into a remote control 327 associated with the computing device 301A, web server 313 may receive data regarding the rewind command, an actionable event (row 423). Accessing table 400, web server 313 may identify a corresponding first actionable instruction in column 403 of a rewind instruction and, in this example, a second actionable instruction in column 405 of a rate of speed instruction. Then web server 313 may transmit, via transmitter 317, one or more of the identified actionable instructions. Accordingly, a second screen device that receives the rewind instruction (actionable instruction in column 403/row 423) may use the instruction to perform some action such as to rewind the second screen content, and/or a second screen device that receives the rate of speed instruction (actionable instruction in column 405/row 423) may use the instruction to perform some action such as to rewind the second screen content in accordance with a rate of speed for rewinding the primary content.

In still other examples, if a user inputs a play command into a remote control 327 associated with the computing device 301A, web server 313 may receive data regarding the play command, an actionable event (row 417). Accessing table 400, web server 313 may identify a corresponding first actionable instruction in column 403 of a play instruction and, in this example, a second actionable instruction in column 405 of a content location instruction. Then web server 313 may transmit, via transmitter 317, one or more of the identified actionable instructions. Accordingly, a second screen device that receives the play instruction (actionable instruction in column 403/row 417) may use the instruction to perform some action such as to play the second screen content, and/or a second screen device that receives the content location instruction (actionable instruction in column 405/row 417) may use the instruction to perform some action such as to identify where the second screen device may locate the second screen content.

Table 400 also may include an actionable event (column 401) that correlates to an incoming call being received from a telephone control system (row 411). As shown in FIG. 3, a telephone control system 341 may be operatively connected with the computing device 301A. Telephone control system 341 may be a computing device configured to detect an incoming call to a home. Although shown as being external to computing device 301A and lighting control system 351, telephone control system 341 may be included within a common physical device as computing device 301A and/or lighting control system 351. In an example, if an incoming telephone call is detected by a telephone control system 341, web server 313 may receive data regarding the incoming call, an actionable event. Accessing table 400, web server 313 may identify a corresponding first actionable instruction in column 403 of a lighting instruction and, in this example, a second actionable instruction in column 405 of an identification instruction. Lighting instruction may be an instruction for a lighting control system to turn on a light. For example, FIG. 3 shows a lighting control system 351 operatively connected to computing device 301A. Lighting control system 351 is a computing device that may receive an actionable instruction directing the system 351 to turn on one or more lights in a room that the computing device 301A is located. Accordingly, if a viewer receives an incoming telephone call, a light in the room may be turned on by the lighting control system 351 in response to the same. An identification instruction may be data regarding the telephone number of the calling party, or the name of the calling party, or some other identification of the incoming call. Such information may be outputted on tablet-style computer 331.

In an example, lighting control system 351 may receive an instruction to turn on one or more lights in response to receipt of a text message or other communication. Similarly, the lighting control system 351 may receive an instruction to turn one or more of the lights back off after a telephone call has ended, after a specified period of time, such as one minute, after a few seconds after a telephone call has been completed, and/or after a few seconds after a text has been received. In still other examples, the lighting control system 351 may be configured to receive data regarding the caller to also determine whether to turn one or more lights on. For example, a viewer may set a list of individuals and/or numbers that, if a call and/or text is received from that number, then television programming content should be paused and the lights in the room should turn on. Accordingly, telephone numbers and/or other identification of individuals not on the list would not have the system turn on lights in the room should a call and/or text be received.

In an example, lighting control system 351 may be configured to operate one or more other or different devices. For example, lighting control system 351 may be configured to turn on lights in response to a doorbell ringing, in response to a door opening in a house of the viewer, in response to a garage door opening (row 433), in response to a timer setting for a cooking appliance, in response to a timer setting for a laundry appliance, and/or in response to an activity of other devices. Still further, lighting control unit may be configured to turn the lights on in a room of the viewer as well as turn an appliance off, such as an oven, in response to an input signal. Accordingly, when a time associated with cooking a meal in an oven expires, the lighting control system may turn on the lights of the room of the viewer to prompt the viewer that the meal is ready.

In another example, table 400 also may include an actionable event (column 401) that correlates to a commercial break being detected in programming content (row 425). Computing device 301A may be configured to detect when a commercial break occurs in programming content received by the computing device 301A. For example, computing device 103A may be configured to detect the presence of a commercial marker in the transmission stream of programming content. Service providers may utilize commercial markers as an indicator of a commercial break occurring in a transmission. Such a commercial marker may include data regarding the duration of an advertisement, an identifier of an advertisement, and/or other data. Service providers may utilize such commercial markers to insert other advertisement content, such as local advertisements to a geographic location of a viewer, in place of another advertisement. In an example, if a commercial break occurs, web server 313 may receive data regarding a commercial marker being detected, an actionable event. Accessing table 400, web server 313 may identify a corresponding first actionable instruction in column 403 of a commercial identification instruction and, in this example, a second actionable instruction in column 405 of an advertisement instruction. An example of a commercial identification instruction may be data that indicates the subject matter of the commercial being received, a duration of the commercial being received, a duration of a set of commercial in a commercial break, and/or other data identifying one or more commercials. Illustrative advertisement instructions may include an instruction to have another computing device, such as tablet-style computer 331, output an advertisement, and/or output a specific advertisement, and/or output a specific type of advertisement.

Figure 16:
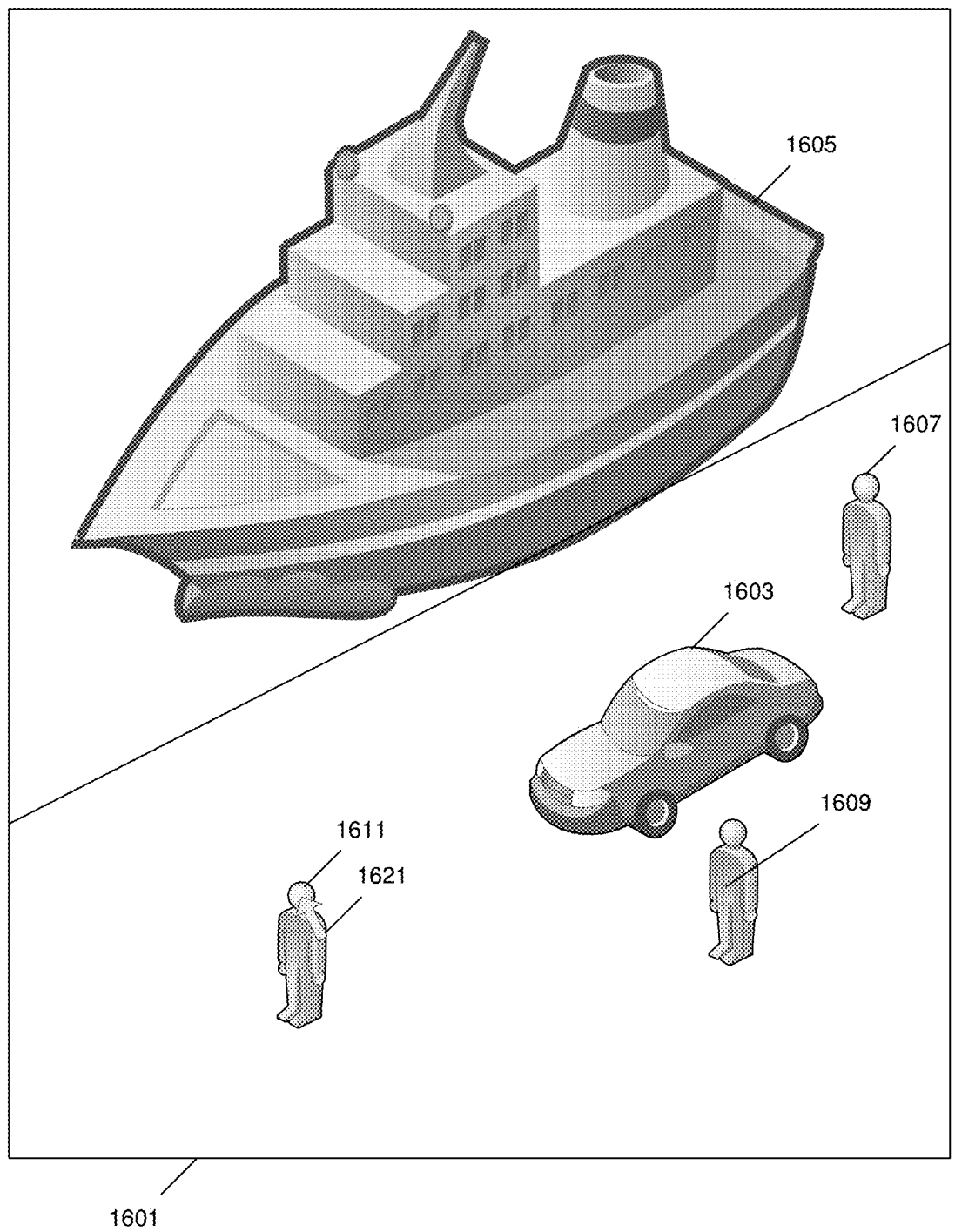
FIG. 16 illustrates an example interactive display according to one or more illustrative aspects of the disclosure.

In still further examples, table 400 also may include an actionable event (column 401) that correlates to an object identifier being identified (row 427). An object identifier may be identified by metadata included in primary content. The objects may be automatically identified and/or be identified in response to an input received by a user. For example, FIG. 16 illustrates an example interactive display according to one or more illustrative aspects of the disclosure. FIG. 16 shows the illustrative display 1601 of primary content that may be outputted to a display screen of a television and/or second screen content that may be outputted to a second screen device. In this example, a scene may be outputted that includes a number of characters (1607, 1609, and 1611) in a television program standing around a dock by a vehicle 1603 and a cruise ship 1605. While a viewer is viewing the display 1601, the viewer may want to obtain more information about a particular object being shown. For example, a viewer may use a pointer, such as pointer 1621, to click on a particular character, such as character 1611. Thus, in accordance with table 400, this may be an example of an actionable event of an object identifier as shown in column 401/row 427. If a user inputs an object identifier command into a remote control 327 associated with the computing device 301A, web server 313 may receive data regarding the object identifier command, an actionable event (row 427). Accessing table 400, web server 313 may identify a corresponding first actionable instruction in column 403 of an object identifier instruction and, in this example, a second actionable instruction in column 405 of an advertisement instruction. Then web server 313 may transmit, via transmitter 317, one or more of the identified actionable instructions. Accordingly, a second screen device that receives the object identifier instruction (actionable instruction in column 403/row 427) may use the instruction to perform some action such as to identify the object the user is pointing to with pointer 1621, and/or the advertisement instruction (e.g., actionable instruction in column 405/row 427) may use the instruction to perform some action such as to provide an advertisement and/or data regarding the identified object. Such an advertisement and/or data may be outputted on a second screen device.

For the example of FIG. 16, a viewer may click on character 1611 to learn who the actor is. By using pointer 1621, the viewer clicks on the character 1611 and a second screen device of the viewer may provide biographical information on the character (whether to the actual character and/or the actor portraying the character) and/or advertisements for other content affiliated with the character and/or the actor. For example, other television programs and/or movies that the actor has starred in, produced, directed, wrote, etc., may be provided with the viewer on a second screen device in order to potential record, rent, and/or buy. In still other examples, a character may be wearing a jacket, such as jacket 1609 in FIG. 16. In the event of a viewer clicking on the jacket 1609 with pointer 1621, the viewer may be provided an opportunity to purchase the same jacket from a web site. Similarly, for vehicle 1603 and/or cruise ship 1605, upon clicking the object a viewer may be provided with data on reviews by other users, public and/or subscriber based safety information, local dealerships and/or current deals, and/or other data about the object.

Figure 17:
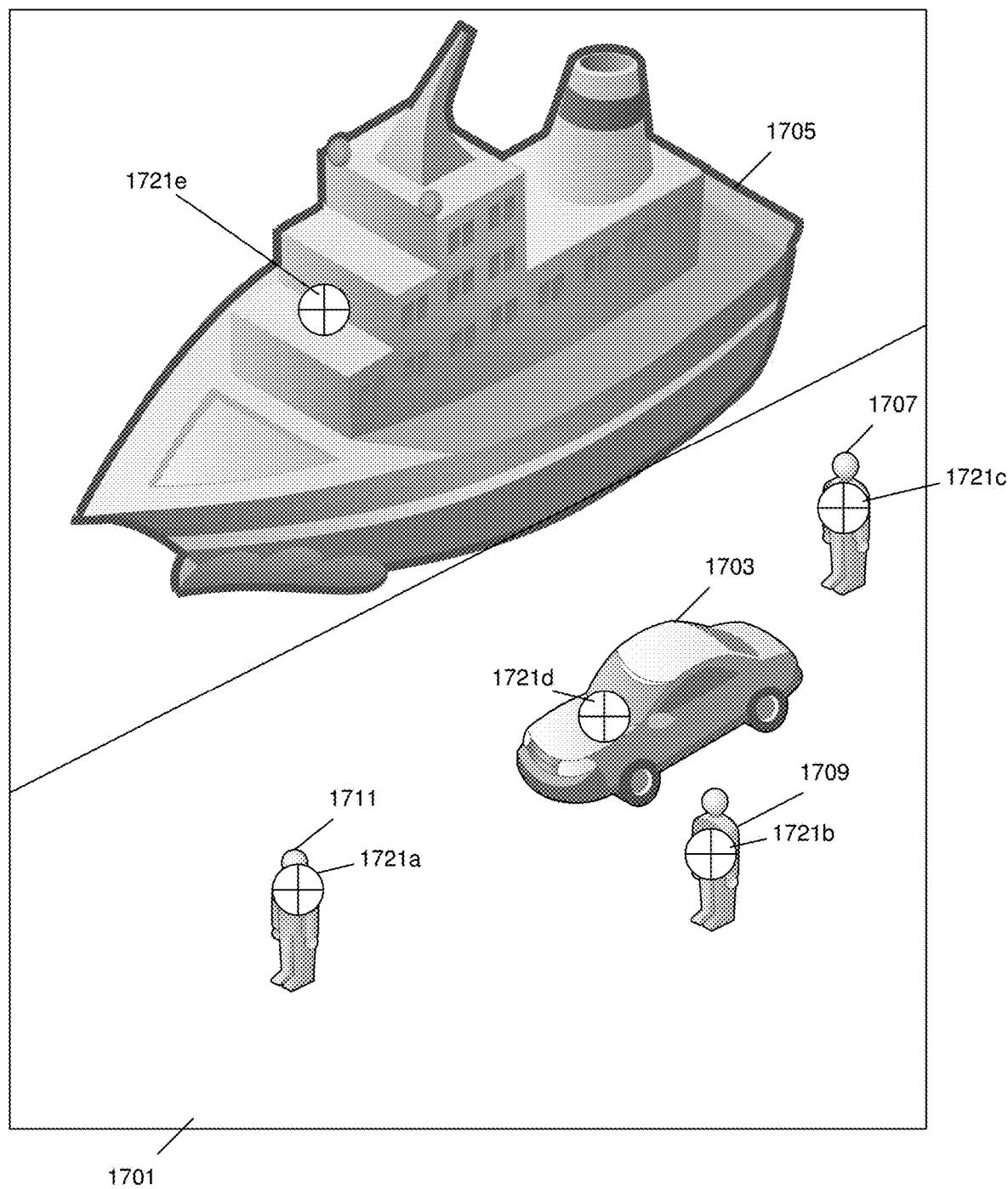
FIG. 17 illustrates an example interactive display according to one or more illustrative aspects of the disclosure.

The objects in a scene may be automatically identified and marked as well. For example, a viewer may have the same primary content being displayed on the second screen device but with object markers already included. Thus a viewer may use a pointing device, such as her finger, to touch the object marker to access additional content, such as information and/or an advertisement. FIG. 17 shows an illustrative display 1701 of primary content with object markers that may be outputted to a display screen of a second screen device. In this example, a scene may be outputted including a number of characters (1707, 1709, and 1711), a vehicle 1703, and a cruise ship 1705. A number of object markers 1721a-1721e are shown as well. While a viewer is viewing the display 1701, the viewer may want to obtain more information about a particular object being shown. Accordingly, a viewer may user her finger to access object marker 1721e to obtain more information and/or an advertisement about cruise ship 1705. Similarly, by accessing one of the other object markers, a viewer may obtain more information and/or an advertisement affiliated with the identified object.

In still additional examples, a viewer may be detected as leaving a room in which a television is located that is displaying primary content. For example, a sensor in the television, in a computing device, such as computing device 301A, and or another device may detect that a viewer has left the room where the television that is outputting the primary content is located. The determination of a viewer leaving a room may be an actionable event and web server 313 may receive data regarding the viewer leaving determination, actionable event (row 429). Accessing table 400, web server 313 may identify a corresponding first actionable instruction in column 403 of a switch primary content instruction and, in this example, a second actionable instruction in column 405 of a play or pause instruction. Then web server 313 may transmit, via transmitter 317, one or more of the identified actionable instructions. Accordingly, when the viewer has left the room with a second screen device, the second screen device that receives the switch primary content instruction (actionable instruction in column 403/row 429) may use the instruction to perform some action such as to switch to display the primary content on the second screen device. A second screen device that receives the pause or play instruction (actionable instruction in column 405/row 429) may use the instruction to perform some action such as to pause or continue playing the second screen content on the second screen device.

In yet another example, the determination of a viewer leaving a room may be an actionable event and web server 313 may receive data regarding the viewer leaving determination, which is an actionable event (row 431). Accessing table 400, web server 313 may identify a corresponding first actionable instruction in column 403 of an advertisement instruction. Then web server 313 may transmit, via transmitter 317, the identified actionable instruction. Accordingly, when the viewer has left the room with a second screen device, the second screen device that receives the advertisement instruction (actionable instruction in column 403/row 431) may use the instruction to perform some action such as to display an advertisement on the second screen device.

In additional examples, a garage door may be detected as being opened. For example, a sensor in a computing device in a garage or pointing at a garage door may detect that a garage door has been opened. The determination of a garage door opening may be an actionable event and web server 313 may receive data regarding the garage door opening determination, actionable event (row 433). Accessing table 400, web server 313 may identify a corresponding first actionable instruction in column 403 of a pause instruction and, in this example, a second actionable instruction in column 405 of a security camera instruction. Then web server 313 may transmit, via transmitter 317, one or more of the identified actionable instructions. Accordingly, the second screen device that receives the pause instruction (actionable instruction in column 403/row 433) may use the instruction to perform some action such as to switch to pause the second screen content on the second screen device and/or a second screen device that receives the security camera instruction (actionable instruction in column 405/row 433) may use the instruction to perform some action such as to provide a video and/or audio feed from a security camera in the house, in the garage and/or outside the house, to be displayed on the second screen device. Such a feed may be concurrently displayed with the second screen content already being displayed and/or may be the only content displayed for some period of time and/or until canceled by the viewer.

In still other examples, if a user inputs a television turn off command into a remote control 327 associated with the computing device 301A, web server 313 may receive data regarding the television turn off command, an actionable event (row 435). Accessing table 400, web server 313 may identify a corresponding first actionable instruction in column 403 of a turn off instruction. Then web server 313 may transmit, via transmitter 317, the identified actionable instruction of a turn off instruction. Accordingly, a second screen device that receives the turn off instruction (actionable instruction in column 403/row 435) may use the instruction to perform some action such as to turn off the second screen content on the second screen device. Table 400 is but one illustrative example and fewer, more, and/or different actionable events and/or actionable instructions may be included.

Also as shown in FIG. 3, computing device 301A may be configured to communicate with one or more other computing device 301B and/or 301C. In one example, computing device 301B may be configured to include the same features as computing device 301A described herein, including a web server 313 while computing device 301C may be a computing device configured to receive and output programming content to an external display, such as a television, but may not include the features of the web server 313 described herein.

Figure 5:
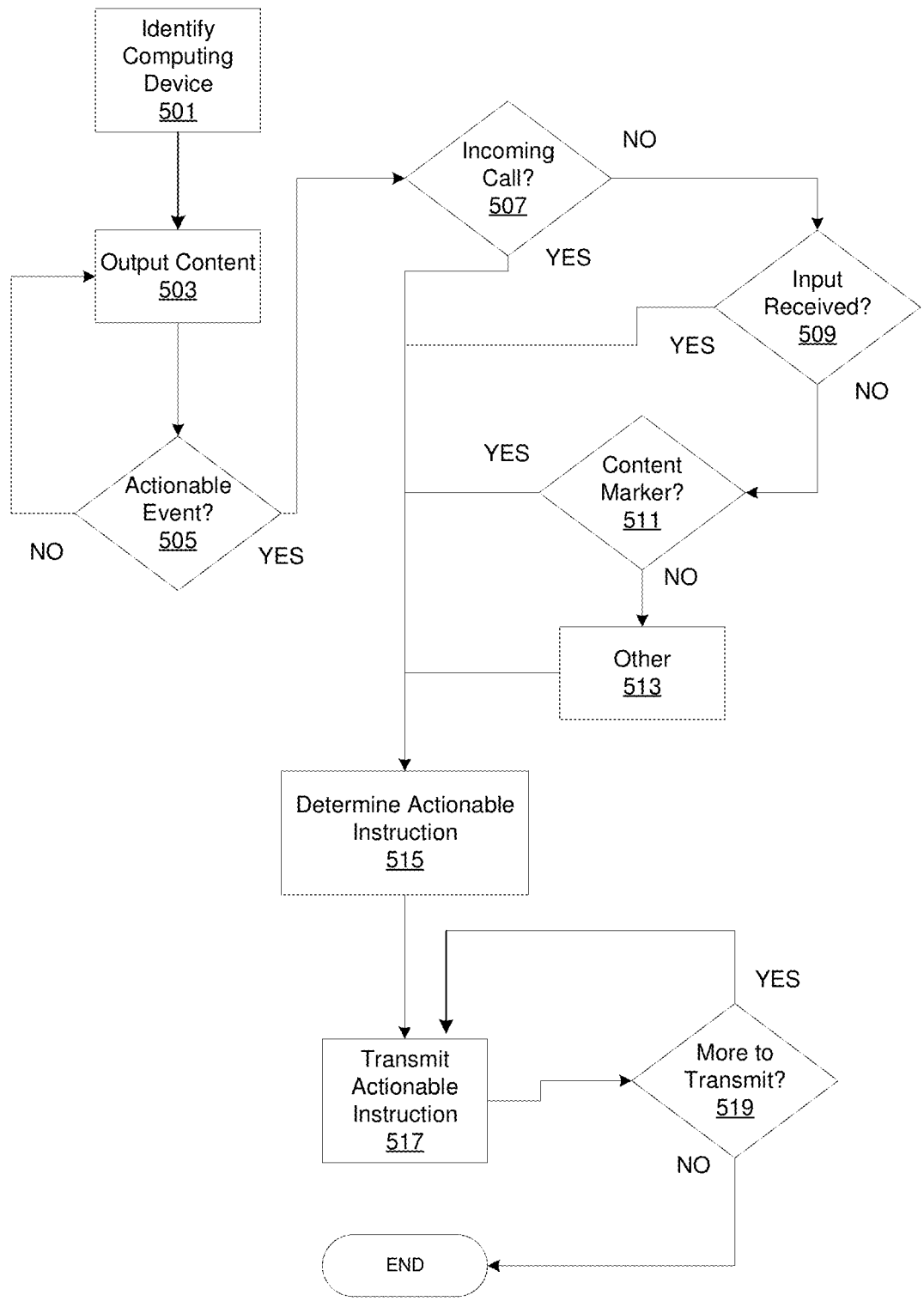
FIG. 5 illustrates an example method of transmitting an actionable instruction according to one or more illustrative aspects of the disclosure.

FIG. 5 illustrates an example method of transmitting an actionable instruction according to one or more illustrative aspects of the disclosure. FIG. 5 may be a scenario in which two computing devices are in communication. Although described with respect to two computing devices, in accordance with aspects described herein, more than two computing devices may be included and one or more steps of the method of FIG. 5 may be repeated and/or altered accordingly, for more computing devices. Some or all of the steps in the method of FIG. 5 may be performed by the computing device 200, 301A, 301B. Specifically, for example, computer-executable instructions may be configured to implement the steps when executed by processor(s) of the computing device 200, 301A, 301B.

In step 501, a first computing device may identify at least one second computing device. The second computing device may be external to the first computing device and configured to receive actionable instructions from the first computing device. For example, a first computing device may be the computing device 301A and at least one second computing device may be the tablet-style computer 331. In step 501, a viewer may log into an account to initiate a second screen experience with a tablet-style computer, and the tablet-style computer may be identified by the first computing device. In such an example the tablet-style computer may send a request to receive actionable instructions from the first computing device. In step 503, content may be outputted by the first computing device. For example, the first computing device is a set-top box and the content is video programming content of a television program. A viewer may be receiving a stream of video programming content and the set-top box outputs the television program to a television.

In step 505, a determination may be made as to whether an actionable event had been determined. The actionable event may be associated with content being outputted to a user via a set-top box. The actionable event may be any of the illustrative actionable events shown in and described with respect to FIG. 4 and/or other actionable events. If no actionable event is determined, the method returns to step 503 where content continues to be outputted to a user. If an actionable event is determined in step 505, the method moves to step 507 where a determination may be made as to whether the actionable event is an incoming call. For example, telephone control system 341 may detect an incoming call and notify computing device 301A of the incoming call. If the actionable event is an incoming call event, the method moves to step 515. Otherwise the method may proceed to step 509.

In step 509, a determination may be made as to whether the actionable event is a user input received by the first computing device. For example, remote control 327 may receive a user input of a fast forward command and may notify computing device 301A of the user input. If the actionable event is a user input event, the method moves to step 515. Otherwise the method may proceed to step 511. In step 511, a determination may be made as to whether the actionable event is a content marker event. For example, computing device 301A may detect the presence of a commercial marker in a transmission of video programming content. If the actionable event is a content marker event, the method moves to step 515. Otherwise the method may proceed to step 513. In step 513, the actionable event may be determined to be some other actionable event, whether based upon an input received by the first computing device and/or some type of indicator in programming content received by the first computing device. For example, a time of day and/or day of week indicator may be determined by computing device 301A. The method then may move to step 515.

In step 515, an actionable instruction correlating to the actionable event may be determined. In some example, an identifier of the actionable event may be determined as the actionable instruction. Thus a fast forward command, identified as an actionable event, may have the system determine the actionable instruction to be "fast forward command received." In an example, an actionable instruction may be identified from a table that correlates actionable events to actionable instructions. Table 400 illustrated in FIG. 4 is one such example table. Then a fast forward command (row 415), identified as an actionable event, may have the system determine the actionable instruction to be an identifier of the rate of speed of the fast forward command and/or a permission/denial instruction.

In step 517, the actionable instruction determined in step 515 may be transmitted to the at least one second computing device, such as tablet-style computer 331. A web server, such as web server 313, in the first computing device may transmit the actionable instruction via a transmitter, such as transmitter 317. In step 517, the method moves to step 519 where a determination may be made as to whether additional actionable instructions are to be transmitted. For example, if there may be more than one actionable instruction for an actionable event, such as shown in row 411 in table 400 of FIG. 4, an additional actionable instruction may need to be transmitted. In such an example, the method returns to step 517 where the additional actionable instruction may be transmitted. When there are no additional actionable instructions to be transmitted, the method may end. In some examples, the transmission in step 517 may be continuous until another actionable event is determined that has a different actionable instruction for transmission. In other examples, an actionable instruction may be transmitted in step 517 for a certain number of times and/or for a certain period of time before the transmissions are stopped. For example, an actionable instruction may be transmitted constantly, may be transmitted five times, or may be transmitted for a one second period of time. Accordingly, in the example of a viewer changing channels, the actionable instruction may skip being transmitted when the viewer cycles through channel changes within a threshold period of time. In the example of multiple actionable instructions for an actionable event, the transmission in step 517 may cycle between the plurality of actionable instructions for an actionable event continuously until an new actionable event is determined or the plurality of actionable instructions may be transmitted for a certain number of times and/or for a certain period of time before the transmission is stopped.

In an illustrative example of an actionable event of an incoming phone call being received, the step of transmitting an actionable instruction in step 517 may include transmitting an instruction to pause content being displayed on the at least one second computing device. Accordingly, the tablet-style computer may pause content being outputted as part of a second screen experience to allow the user the opportunity to determine whether to answer the incoming phone call. In an illustrative example of an actionable event of a channel change operation being received, the actionable instruction may include an identifier of a new channel corresponding to the channel change operation. Accordingly, should a user change the channel from HBO to NBC, the actionable instruction may be an identifier of NBC since that is the channel that the user changed to as part of the channel change operation.

In an illustrative example of an actionable event of a play command being received, the actionable instruction may include an identifier of the play command being received or an identifier of the playing of the content associated with the play command being initiated. Accordingly, should a user initiate to play content that was paused, the command to play may be transmitted to a tablet-style computer to initiate a similar command to play secondary content on the tablet-style computer. In an illustrative example of an actionable event of a content marker identifying an advertisement, the actionable instruction may include an instruction to output a second advertisement on the at least one second computing device. For example, when a user is watching a television program and a commercial marker is determined, an actionable instruction may be transmitted to a tablet-style computer of the user in a second screen experience to have the tablet-style computer output a second advertisement. The second advertisement may be the same advertisement being outputted by the first computing device as part of the received television programming or may be a different advertisement.

Figure 6:
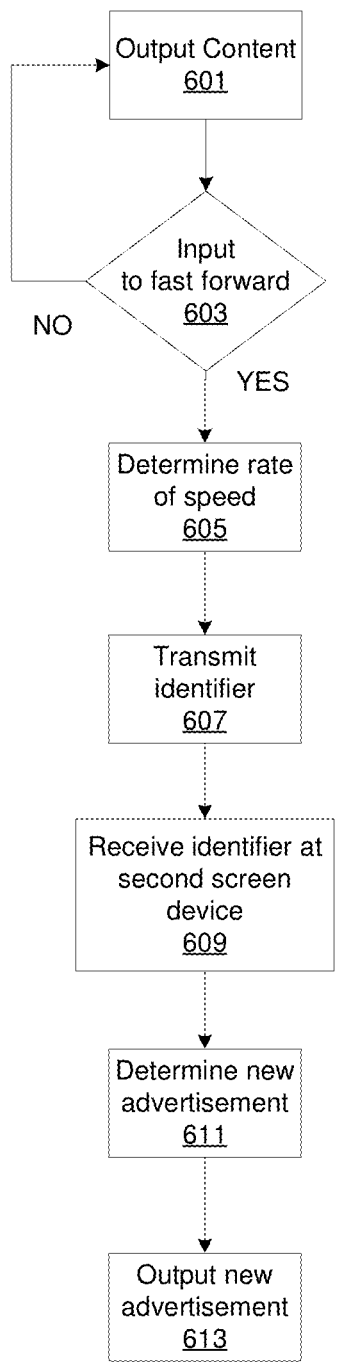
FIG. 6 illustrates an example method of controlling a second screen experience based upon a rate of speed of fast forwarding according to one or more illustrative aspects of the disclosure.

FIG. 6 illustrates an example method of controlling a second screen experience based upon a rate of speed of fast forwarding according to one or more illustrative aspects of the disclosure. FIG. 6 may be a scenario in which two computing devices are in communication. Although described with respect to two computing devices, in accordance with aspects described herein, more than two computing devices may be included and one or more steps of the method of FIG. 6 may be repeated and/or altered accordingly, for more computing devices. Some or all of the steps in the method of FIG. 6 may be performed by the computing device 200, 301A, 301B, 331. Specifically, for example, computer-executable instructions may be configured to implement the steps when executed by processor(s) of the computing device 200, 301A, 301B, 331.

In step 601, content may be outputted by a first computing device. For example, the first computing device is a set-top box and the content is video programming content of a television program. A viewer may be receiving a stream of video programming content and the set-top box outputs the television program to a television. In step 603, a determination may be made as to whether an input of a fast forward command has been received. The input of a fast forward command being received may be via a computing device, such as a set-top box, receiving a user input to fast forward via a remote control, such as remote control 327. If no input is received, the method may return to step 601 where content continues to be outputted to a user. If a fast forward input is received in step 603, the method moves to step 605.

In step 605, a rate of speed of the fast forward input may be determined. For example, multiple speeds for fast forwarding may be available for a user and the user may have inputted a command for maximum fast forwarding, such as 16 times speed. In other examples, a user may have entered a request for 2 times speed or 4 times speed. The rate of speed may be determined by a code transmitted form a remote control to the computing device. Such a code may be an identifier of the speed of the fast forward command. In the example of FIG. 3, a user may enter three fast forward inputs to remote control 327, and remote control 327 may interpret the three inputs as a fast forward input for a rate of speed of 8 times normal speed. In step 607, an identifier of the fast forward command may be transmitted to a second computing device, such as tablet-style computer 331. A web server, such as web server 313, in the first computing device may transmit the identifier via a transmitter, such as transmitter 317. The identifier may include the rate of speed of the fast forward command determined in step 605.

In step 609, a second computing device may receive the identifier. Such an example may be a tablet-style computer receiving the identifier for a user's second screen experience. In step 611, a new advertisement may be determined to output on the second computing device. The new advertisement may be determined based upon the rate of speed included in the identifier received in step 609. For example, based upon a rate of speed of the fast forward command being 2 times the normal speed, the new advertisement determined in step 611 may be an advertisement that is half the duration of an advertisement outputted in television programming via the first computing device that received the fast forward operation by a user. In one example, the second computing device may include a table of advertisement correlating to a rate of speed of a fast forward command. The second computing device may determine the advertisement to output by accessing the table and determining the advertisement to output. In still other examples, additional parameters may be determined. For example, the size of an advertisement based upon the type of second computing device may be determined. Accordingly, in the situations in which a user is using a mobile phone in comparison to a tablet-style computer, the size of the advertisement may be different. In still other scenarios, the placement or an advertisement, and/or the type (banner, popup, etc.) of the advertisement may be determined. One or more of these determinations may be based upon the type of second computing device.

The second computing device also may time sync the advertisement for output by the second computing device to the rate of speed of the fast forward command. For example, an advertisement on the second computing device may be chosen and time synced to the specific rate of speed of the fast forward command. In another example, the rate of speed of the fast forward command may be determined to be above some threshold rate of speed and the advertisement determined in step 611 may be determined to be a slate of static advertisements. Accordingly, if a rate of speed of a fast forward command is above some threshold rate of speed, such as 8 times the normal speed, a slate of static advertisements may be determined as the advertisement to output on the second computing device. In step 613, the new advertisement determined in step 611 may be outputted by the second computing device.

Figure 7:
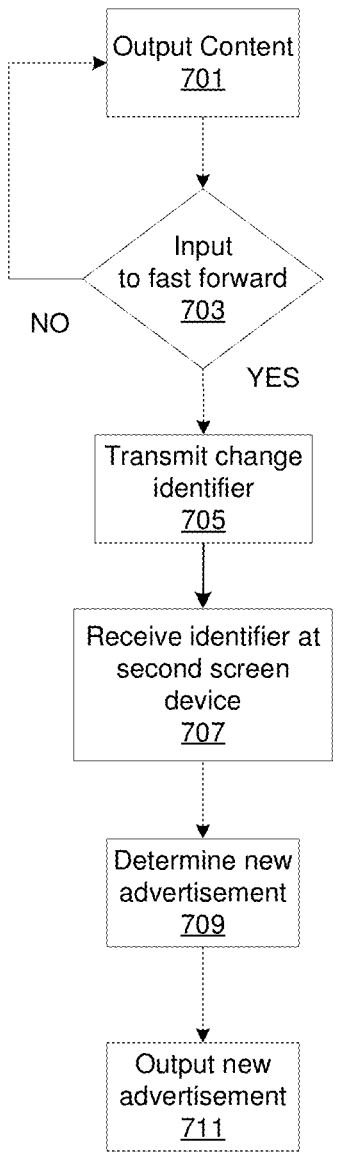
FIG. 7 illustrates an example method of swapping the location of advertisements during a second screen experience according to one or more illustrative aspects of the disclosure.

FIG. 7 illustrates an example method of modification of advertisements during a second screen experience according to one or more illustrative aspects of the disclosure. FIG. 7 may be a scenario in which two computing devices are in communication. Although described with respect to two computing devices, in accordance with aspects described herein, more than two computing devices may be included and one or more steps of the method of FIG. 7 may be repeated and/or altered accordingly, for more computing devices. Some or all of the steps in the method of FIG. 7 may be performed by the computing device 200, 301A, 301B, 331. Specifically, for example, computer-executable instructions may be configured to implement the steps when executed by processor(s) of the computing device 200, 301A, 301B, 331.

In step 701, content may be outputted by a first computing device. For example, the first computing device is a set-top box and the content is programming content of a video on-demand television program. A viewer may be receiving a stream of the video on-demand television program and the set-top box may output the television program to a television. In step 703, a determination may be made as to whether an input of a fast forward command has been received. The input of a fast forward command being received may be via a computing device, such as computing device 301A. The command may be to fast forward through a first set of advertisement in the content. The input may be received via a remote control, such as remote control 327. If no input is received, the method returns to step 701 where content continues to be outputted to a user. If a fast forward input is received in step 703, the method moves to step 705.

In step 705, an identifier of an instruction to change a first set of advertisements in video programming content received at the first computing device to a second set of advertisements for output on a second computing device may be transmitted to the second computing device, such as tablet-style computer 331. A web server, such as web server 313, in the first computing device may transmit the identifier via a transmitter, such as transmitter 317. The identifier may include a rate of speed of the fast forward command received in step 703, a duration of time of the first set of advertisements, an identification of the first set of advertisements, and/or other data.

In step 707, the second computing device may receive the identifier. Such an example may be a tablet-style computer receiving the identifier for a user's second screen experience. In step 709, the second set of advertisements may be determined to output on the second computing device. The second set of advertisements may be determined based upon the rate of speed of a fast forward command to fast forward via a first set of advertisements being outputted on the first computing device, a duration of time of the first set of advertisements, the identification of the first set of advertisements, and/or other data. In other examples, the identifier may be an instruction to change the location of the first set of advertisements being outputted from the first computing device to the second computing device. The second set of advertisements may be a portion or subset of the first set of advertisements. In other examples the second set may be related advertisements to the first set of advertisements, such as a different advertisement for the same product, advertisements of a competitor product to a product in the first set of advertisements, and/or some combination thereof. In step 711, the new set of advertisements determined in step 709 may be outputted by the second computing device.

Figure 8:
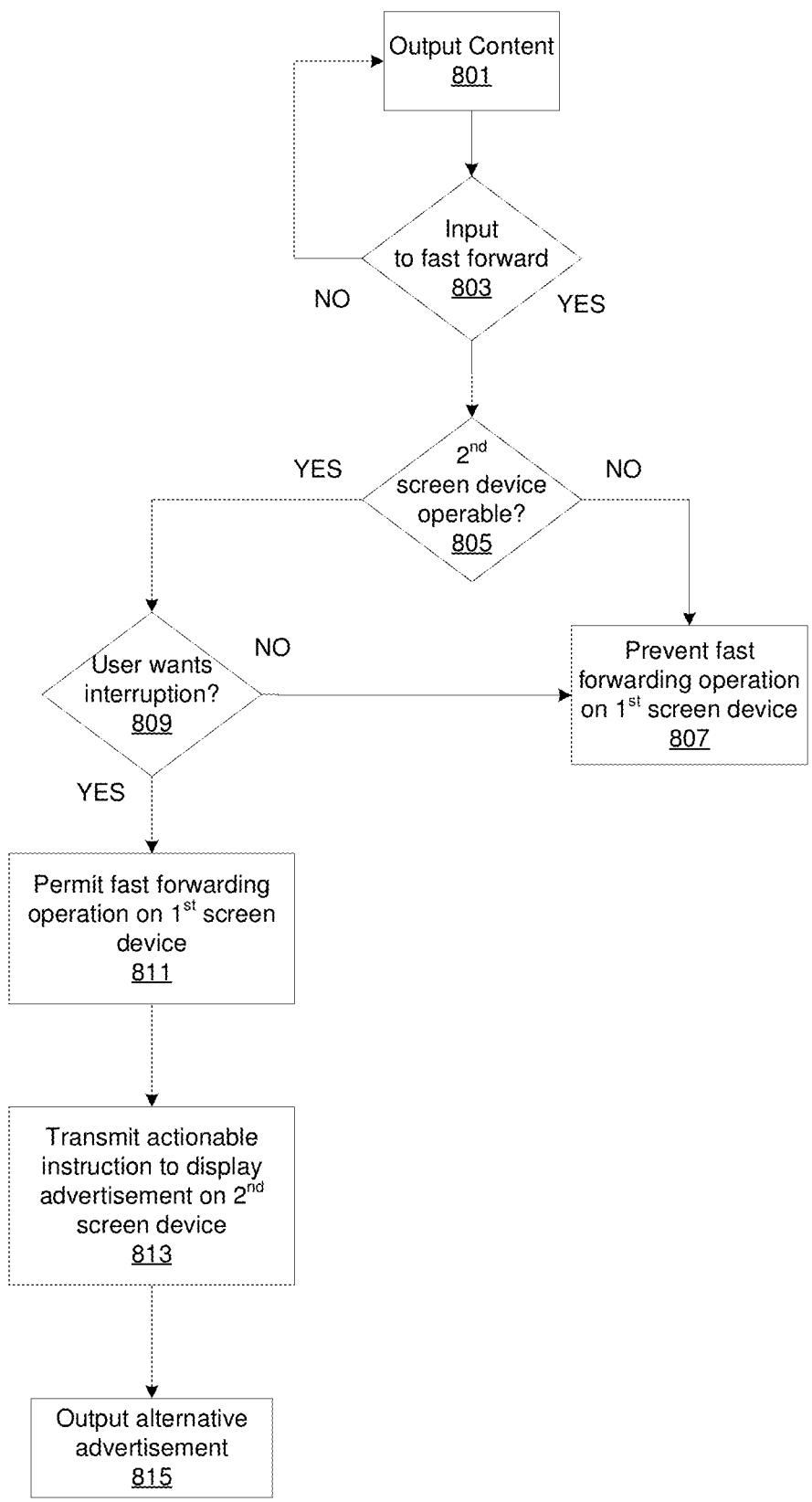
FIG. 8 illustrates an example method of determining whether to allow a user to fast forward through content according to one or more illustrative aspects of the disclosure.

FIG. 8 illustrates an example method of determining whether to allow a user to fast forward through content according to one or more illustrative aspects of the disclosure. FIG. 8 may provide an example where a user is not permitted to fast forward through content, such as an advertisement, when outputted on a first computing device unless a second computing device is configured to output an alternative advertisement during the fast forward operation. FIG. 8 may be a scenario in which two computing devices are in communication. Although described with respect to two computing devices, in accordance with aspects described herein, more than two computing devices may be included and one or more steps of the method of FIG. 8 may be repeated and/or altered accordingly, for more computing devices. Some or all of the steps in the method of FIG. 8 may be performed by the computing device 200, 301A, 301B, 331. Specifically, for example, computer-executable instructions may be configured to implement the steps when executed by processor(s) of the computing device 200, 301A, 301B, 331.

In step 801, content may be outputted by a first computing device. For example, the first computing device is a set-top box and the content is video programming content of a television program. A viewer may be receiving a stream of video programming content and the set-top box outputs the television program to a television. In step 803, a determination may be made as to whether an input of a fast forward command has been received. The input of a fast forward command being received may be a computing device, such as a set-top box, receiving a user input to fast forward via a remote control, such as remote control 327. If no input is received, the method returns to step 801 where content continues to be outputted to a user. If a fast forward input is received in step 803, the method moves to step 805.

In step 805, a further determination may be made as to whether a second computing device configured to provide a second screen experience to a user is operable. Tablet-style computer 331 in FIG. 3 is an illustrative second computing device. In step 805, a determination may be made that the second computing device is turned on and able to receive actionable instructions for outputting an advertisement or other content on the second computing device. Alternatively or additionally, in step 805 a determination may be made that a program, such as an application program, currently is operating on the second computing device. Alternatively or additionally, in step 805 a determination may be made that the second computing device is currently receiving data transmitted by the first computing device.

If the determination in step 805 is that the second computing device is not operable to output an alternative advertisement to the advertisement being outputted on the first computing device, the method may move to step 807 where the fast forward operation being requested by a user is prevented. Thus, the user cannot fast forward through the advertisement being outputted on the first computing device. Alternatively, if the second computing device is in operation to output an alternative advertisement in step 805, the method moves to step 809 where a determination may be made as to whether the viewer wants a current experience on her second computing device interrupted. In an example, the viewer is playing a game and/or watching the content on the second screen device. If the user does not permit the operation in step 809, the method moves to step 807 and the second computing device experience is not interrupted. Alternatively, if the viewer authorizes the interruption on the second computing device, in step 809, the method moves to 811, where the fast forward operation being requested by a user is permitted. Thus. the user can fast forward through the advertisement being outputted on the first computing device since the second screen experience can output an alternative advertisement.

In step 813, an actionable instruction may be transmitted to the second computing device. A web server, such as web server 313, in the first computing device may transmit the actionable instruction via a transmitter, such as transmitter 317. The actionable instruction may include a specific advertisement to be outputted on the second computing device, a rate of speed of the fast forward command received in step 803, a duration of time for outputting the alternative advertisement by the second computing device, and/or other data allowing the second computing device to output the alternative advertisement. Upon receiving the actionable instruction, in step 815 the second computing device may output the alternative advertisement.

Figure 9:
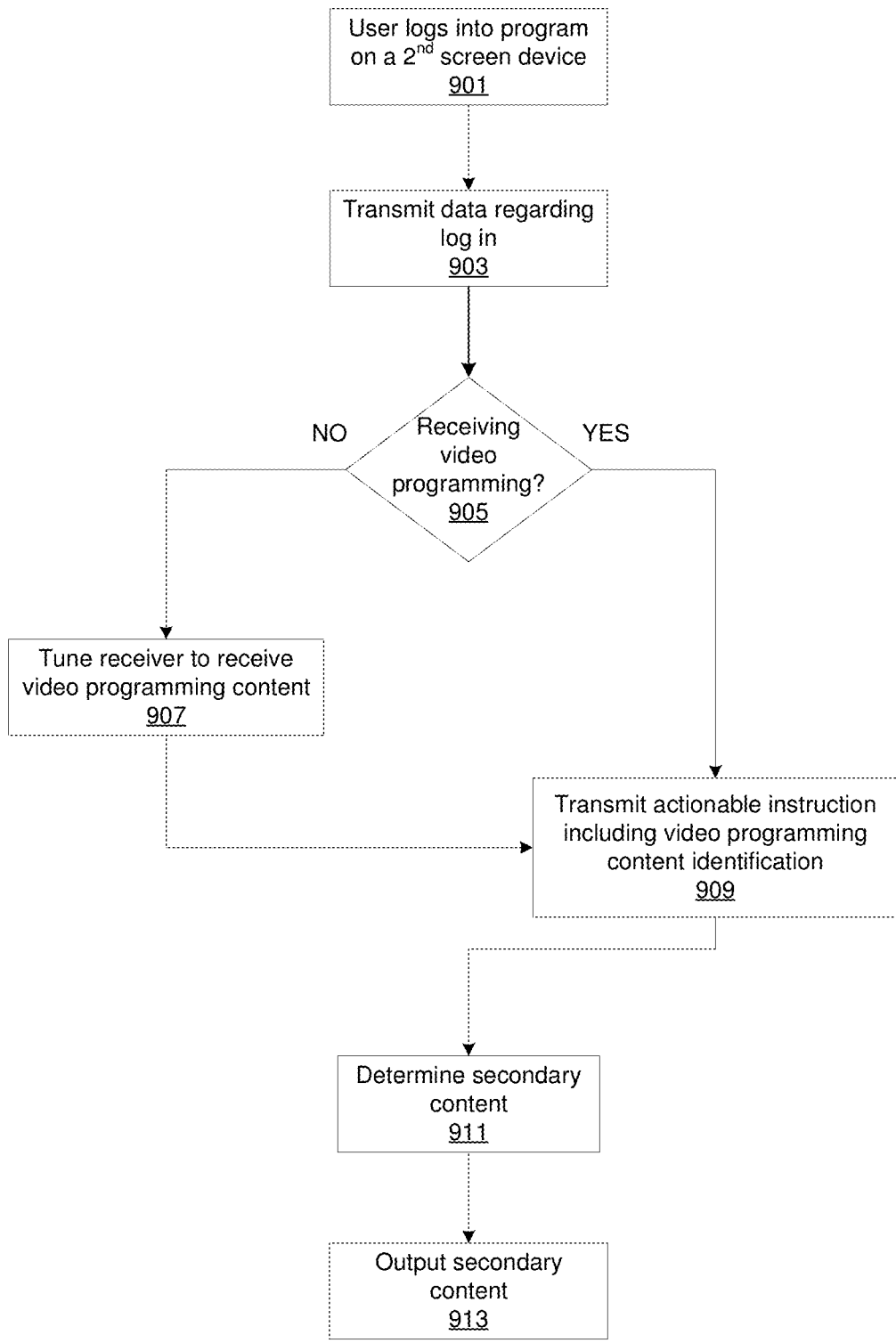
FIG. 9 illustrates an example method of providing a second screen experience to a user according to one or more illustrative aspects of the disclosure.

FIG. 9 illustrates an example method of providing a second screen experience to a user according to one or more illustrative aspects of the disclosure. This example may be a situation of logging in to view video content by a viewer. FIG. 9 may be a scenario in which two computing devices are in communication. Although described with respect to two computing devices, in accordance with aspects described herein, more than two computing devices may be included and one or more steps of the method of FIG. 9 may be repeated and/or altered accordingly, for more computing devices. Some or all of the steps in the method of FIG. 9 may be performed by the computing device 200, 301A, 301B, 331. Specifically, for example, computer-executable instructions may be configured to implement the steps when executed by processor(s) of the computing device 200, 301A, 301B, 331.

In step 901, a user may log into a program on a computing device, such as a tablet-style computer, for a second screen experience. In one example, a user may have a downloaded application program resident on the computing device, such as a tablet-style computer. In other example the user may log in via a website via a browser on the computing device. As part of the second screen experience, logging into the program may require the user to be authenticated and the user may have to supply some form of identification, such as an account name/number and/or a password.

In step 903, data representative of a user logging into a program on tablet-style computer that interacts with a first computing device, such as a set-top box, may be received. In an example of step 903, the computing device 301A may receive the data from the tablet-style computer 331. The data may be an indicator that the tablet-style computer is operable to initiate a second screen experience. In step 905, a determination may be made as to whether the set-top box currently is receiving video programming content. For example, the computing device 301A is a set-top box that currently does not have power to a receiver in the set-top box to tune to some type of video programming content. If the set-top box currently is receiving video programming output, the method moves to step 909. Otherwise the method moves to step 907.

In step 907, responsive to the determination in step 905 that the set-top box is not receiving video programming content, a receiver of the set-top box automatically may be tuned to receive video programming content. In an illustrative example, the receiver may be supplied power in order to tune to a particular channel of video programming content. Accordingly, a user may turn on a first screen experience via the computing device configured to output the second screen experience.

In step 909, an actionable instruction may be transmitted to the tablet-style computer 331 by the set-top box. A web server, such as web server 313, in the set-top box may transmit the actionable instruction via a transmitter, such as transmitter 317. The actionable instruction may include data identifying television programming content being received by the set-top box, an instruction to have the tablet-style computer output content related to the video programming content being outputted by the set-top box, and/or other data. In the example of content related to television programming content being outputted by the set-top box, such content may include an advertisement for a different episode or different season of the television programming content.

In step 911, secondary content to output on the tablet-style computer may be determined. The secondary content may be determined based upon one or more actionable instructions received from the set-top box. In step 913, the secondary content determined in step 911 may be outputted by the tablet-style computer.

Figure 10:
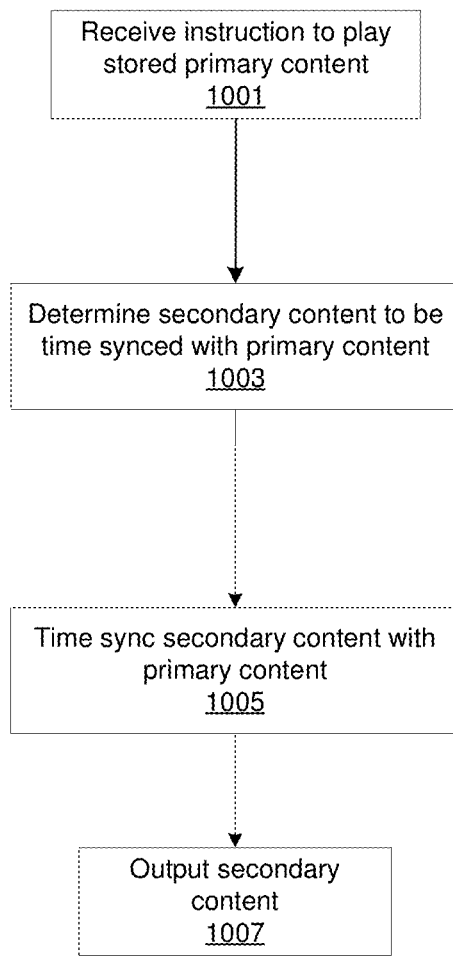
FIG. 10 illustrates an example method of syncing recorded content with other content for a second screen experience according to one or more illustrative aspects of the disclosure.

FIG. 10 illustrates an example method of syncing recorded content on a first computing device with other content for a second screen experience according to one or more illustrative aspects of the disclosure. For example, FIG. 10 may describe a situation in which a viewer is watching a recorded television program from her digital video recorder and wants to concurrently have a second screen experience that occurred during the original broadcast of the television program, such as social media postings that occurred during the original broadcast. FIG. 10 may be a scenario in which two computing devices are in communication. Although described with respect to two computing devices, in accordance with aspects described herein, more than two computing devices may be included and one or more steps of the method of FIG. 10 may be repeated and/or altered accordingly, for more computing devices. Some or all of the steps in the method of FIG. 10 may be performed by the computing device 200, 301A, 301B, 331. Specifically, for example, computer-executable instructions may be configured to implement the steps when executed by processor(s) of the computing device 200, 301A, 301B, 331.

In step 1001, an identifier of an actionable instruction to play stored primary content at a first computing device may be received by a second computing device. Such stored primary content may be previously recorded primary content maintained in a memory storage of the first computing device, such as memory storage 321 in computing device 301A and/or in a networked storage, such as a storage medium accessible to computing device 301A via network interface 323.

In step 1003, secondary content to be time synced with the primary content being outputted by the first computing device may be determined. The secondary content may be determined based upon the identifier of the actionable instruction. Time syncing secondary content with primary content that is played at a later time than being received live allows for a user to have a second screen experience just like someone who experienced the primary content live. For example, the secondary content may be content from a social media feed recorded at a time of recording the primary content. In such an example, the secondary content of one or more social media feeds may be recorded concurrently with the primary content and maintained in a memory storage, such as memory storage 321 and/or a networked memory storage accessible via network interface 323. In some examples, the social media feed may be a social media feed of a producer of the primary content. For example, if the primary content is a recording of an NBC television program, the secondary content may be an official social media feed of the producer of the NBC television program.

In step 1005, the determined secondary content may be time synced with the primary content. Thus, a time of playing the primary content may be taken into account for syncing secondary content with the primary content. In the example of the primary content being played in a later time zone, the secondary content may be restricted from having comments as part of a social media feed being outputted as part of the secondary content that occurred later in the original transmission of the primary content in another time zone. Accordingly, a user in a later viewing time zone will not have spoilers occur due to the comments of others in a social media feed as part of a second screen experience. In step 1007, the secondary content may be outputted by the second computing device. In this example, the secondary content is time synced with the primary content.

Figure 11:
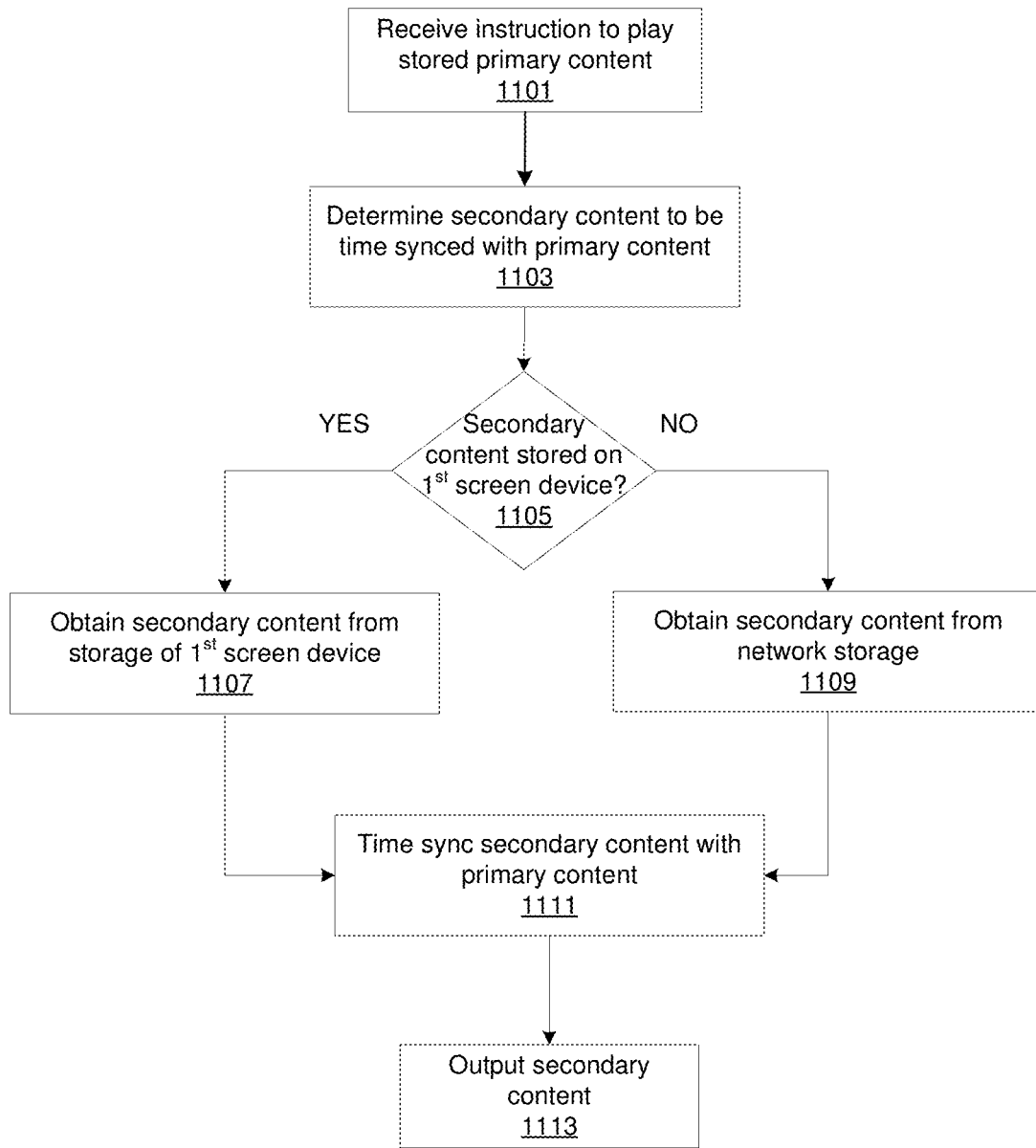
FIG. 11 illustrates an example method of retrieving secondary content for a second screen experience according to one or more illustrative aspects of the disclosure.

FIG. 11 illustrates an example method of retrieving secondary content for a second screen experience that occurred during recording of primary content by a first computing device according to one or more illustrative aspects of the disclosure. FIG. 11 may be a scenario in which two computing devices are in communication. Although described with respect to two computing devices, in accordance with aspects described herein, more than two computing devices may be included and one or more steps of the method of FIG. 11 may be repeated and/or altered accordingly, for more computing devices. Some or all of the steps in the method of FIG. 11 may be performed by the computing device 200, 301A, 301B, 331. Specifically, for example, computer-executable instructions may be configured to implement the steps when executed by processor(s) of the computing device 200, 301A, 301B, 331.

In step 1101, a request to play stored primary content at a first computing device may be received by the first computing device. Such stored primary content may be on-demand primary content maintained in a networked storage, such as a storage medium accessible to computing device 301A via network interface 323 or previously recorded primary content maintained in a memory storage of the first computing device, such as memory storage 321 in computing device 301A. In step 1103, secondary content to be time synced with the primary content being outputted by the first computing device may be determined.

In step 1105, a determination may be made as to whether the secondary content is maintained in the first computing device. Such a determination may be made when determining if a social media feed was recorded with the primary content and maintained in the storage medium 321 of the computing device 301A or whether the secondary content was recorded and maintained in a networked storage medium. If the secondary content is maintained in the first computing device, the method moves to step 1107 where the secondary content may be obtained from a memory storage of the first computing device. In one example, an actionable instruction may be transmitted from the first computing device to a second computing device to have the second computing device obtain the secondary content. Such an actionable instruction may include an instruction to have the second computing device receive the secondary content from a memory storage in the first computing device.

If the determination in step 1105 is that the secondary content is not maintained in the first computing device, the method moves to step 1109 where the secondary content may be obtained from a networked memory storage. In one example, an actionable instruction may be transmitted from the first computing device to a second computing device to have the second computing device obtain the secondary content. Such an actionable instruction may include an instruction to have the second computing device receive the secondary content from a networked memory storage that is not in the first computing device.

In accordance with some examples of the disclosure, a portion of the secondary content may be maintained in a memory storage in the first computing device and another portion may be maintained in a networked memory storage. For example, the secondary content includes two different social media feeds. The two social media feeds may have been recorded at the time of the primary content being first transmitted. One of the social media feeds may have been recorded and maintained in a memory storage in the first computing device while the other social media feed may have been recorded to a networked memory storage not included in the first computing device. In such an example, the second computing device may receive the first portion of secondary content from the first computing device and the second portion of the secondary content from the networked memory storage.

In step 1111, the secondary content may be time synced with the primary content. Thus, a time of playing the primary content may be taken into account for syncing secondary content with the primary content. In step 1113, the secondary content may be outputted by the second computing device. In this example, the secondary content is time synced with the primary content.

Figure 12:
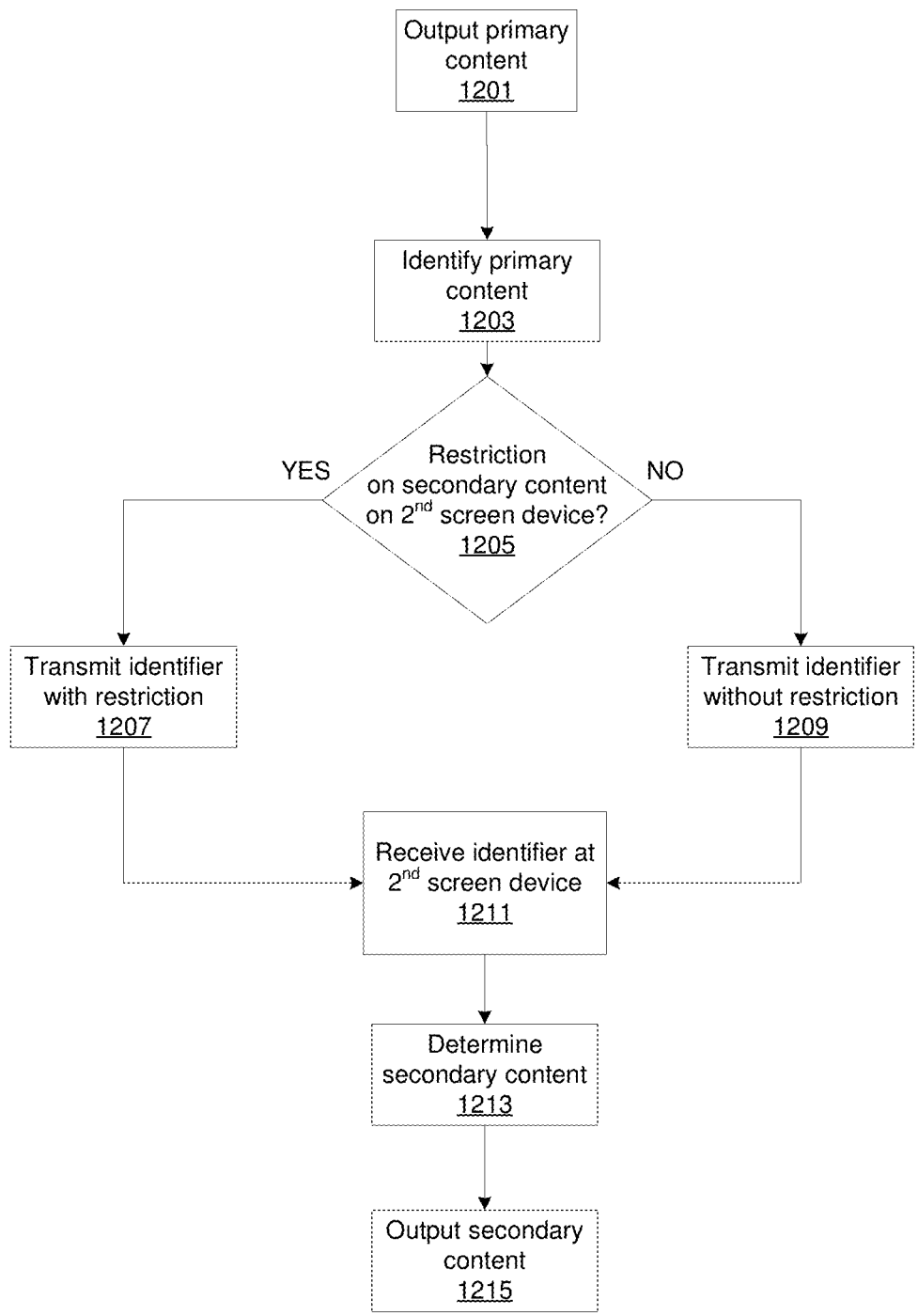
FIG. 12 illustrates an example method of configuring a second screen experience based upon a context of the primary screen experience according to one or more illustrative aspects of the disclosure.

FIG. 12 illustrates an example method of configuring a second screen experience based upon a context of the primary screen experience where original secondary content may be restricted and/or replaced by different secondary content according to one or more illustrative aspects of the disclosure. FIG. 12 may be a scenario in which two computing devices are in communication. Although described with respect to two computing devices, in accordance with aspects described herein, more than two computing devices may be included and one or more steps of the method of FIG. 12 may be repeated and/or altered accordingly, for more computing devices. Some or all of the steps in the method of FIG. 12 may be performed by the computing device 200, 301A, 301B, 331. Specifically, for example, computer-executable instructions may be configured to implement the steps when executed by processor(s) of the computing device 200, 301A, 301B, 331.

In step 1201, content may be outputted by a first computing device, such as computing device 301A. For example, the first computing device is a set-top box and the content is video programming content of a live sporting event. A viewer may be receiving a stream of the video programming content and the set-top box outputs the live sporting event to a television. In step 1203, the primary content may be identified in some form. For example, in an example where the primary content is a video programming content, the identification of the primary content may include an episode number of the video programming content. The episode number may be an identifier of a particular episode of a particular season or an identifier of the actual number of the episode. For example, assuming a season for a particular video programming content is 10 episodes, an episode number for the video programming content may be episode 42 or season 4, episode 2.

In step 1205, a determination may be made as to whether a restriction on secondary content to be outputted on a second computing device for a second screen experience is needed. Such a restriction may be a case where the secondary content is preventing from being an advertisement for a later episode of the primary content. A service provider may not want to spoil the current experience of the user and thus may want to restrict secondary content to be outputted as part of the second screen experience. If the determination is that a restriction is to be made on the secondary content, the method moves to step 1207 where a message that may include an identifier and/or the restriction may be transmitted to the second computing device, such as tablet-style computer 331. A web server, such as web server 313, in the first computing device may transmit the identifier via a transmitter, such as transmitter 317. The method may then proceed to step 1211.

If the determination is that a restriction is not to be made on the secondary content in step 1205, the method moves to step 1209 where message that may include an identifier without the restriction may be transmitted to the second computing device, such as tablet-style computer 331. A web server, such as web server 313, in the first computing device may transmit the identifier via a transmitter, such as transmitter 317. The method may then proceed to step 1211. In step 1211, the second computing device may receive the identifier. Such an example may be a tablet-style computer receiving the identifier for a user's second screen experience. In step 1213, the secondary content may be determined to output on the second computing device. In some examples, the secondary content may include an advertisement for a different episode number of the primary content, such as a later season and later episode of the primary content. In other examples, the secondary content determined in step 1213 may be based upon the restriction, if present, included from step 1207. Accordingly, the secondary content may be prevented from being an advertisement for a later episode of the primary content or even any episode of the primary content. In step 1215, the secondary content determined in step 1213 may be outputted by the second computing device.

Figure 13:
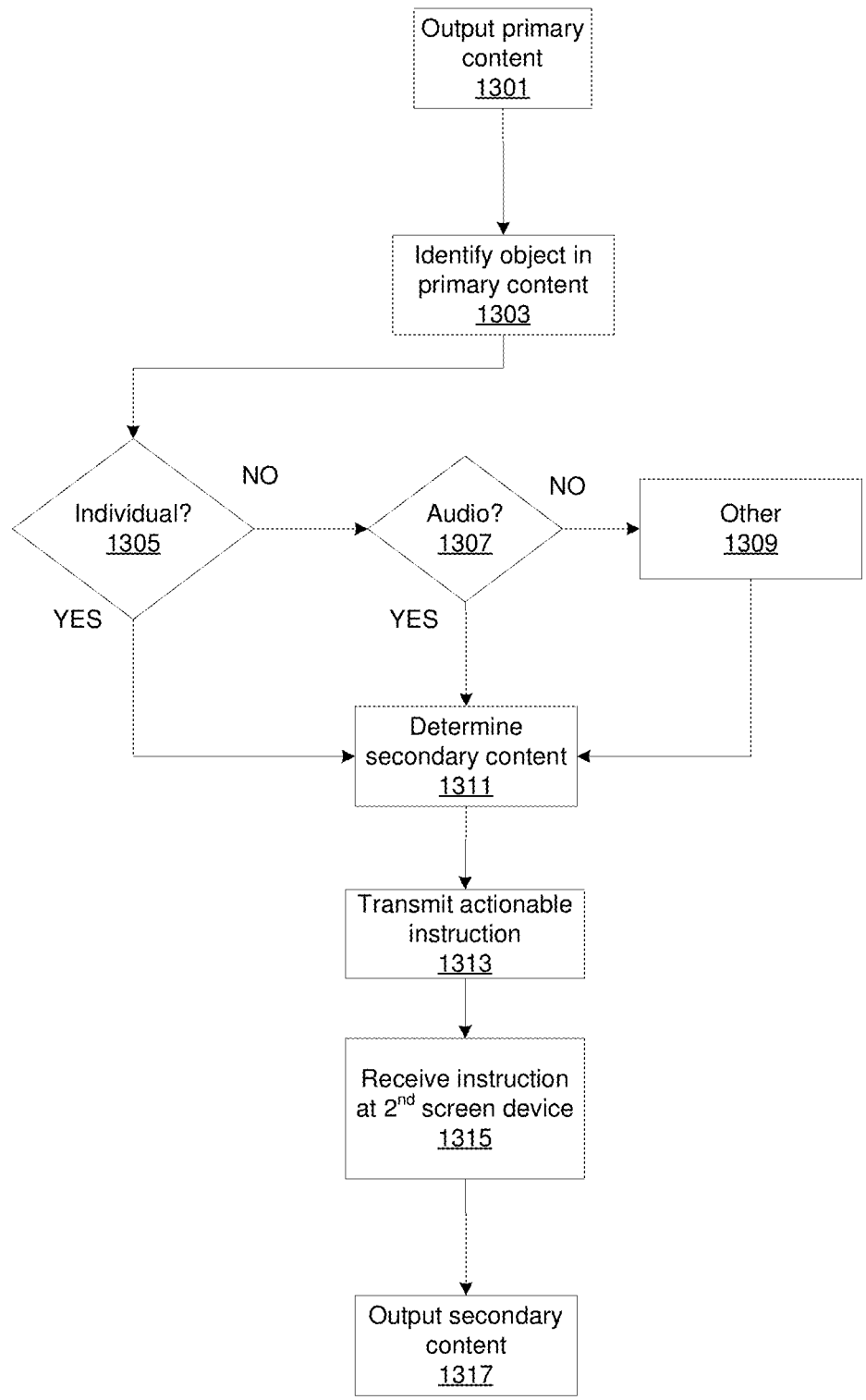
FIG. 13 illustrates an example method of dynamic advertising in a second screen experience according to one or more illustrative aspects of the disclosure.

FIG. 13 illustrates an example method of dynamic advertising in a second screen experience according to one or more illustrative aspects of the disclosure. Such an example may be a situation where secondary content is determined based upon what is actually within the video programming content being viewed. FIG. 13 may be a scenario in which two computing devices are in communication. Although described with respect to two computing devices, in accordance with aspects described herein, more than two computing devices may be included and one or more steps of the method of FIG. 13 may be repeated and/or altered accordingly, for more computing devices. Some or all of the steps in the method of FIG. 13 may be performed by the computing device 200, 301A, 301B, 331. Specifically, for example, computer-executable instructions may be configured to implement the steps when executed by processor(s) of the computing device 200, 301A, 301B, 331.

In step 1301, content may be outputted by a first computing device, such as computing device 301A. For example, the first computing device is a set-top box and the content is video programming content of a television program. A viewer may be receiving a stream of the video programming content and the set-top box may be outputting the television program to a television. In step 1303, an object in the primary content may be identified in some form. For example, in an example where the primary content is a television program, objects in the primary content may be one or more actors or characters, one or more animals, one or more items such as a table, sofa, or chair, one or more sounds such as music, and/or other objects, such as clothing, places, products, or vehicles. The identification of and object in the primary content may include receiving some type of input at a remote control of the computing device from a user to learn more about the object in the primary content. In other examples, one or more objects automatically may be identified without a requirement of user input being received.

In step 1305, a determination may be made as to whether the identified object is an individual, whether a particular actor/actress or a character in the television program. For example, a user may be watching AMC's "The Walking Dead" television program and may enter an input to learn more about the character Rick Grimes on the television program or the actor that portrays him, Andrew Lincoln. If the identified object in step 1303 is an individual, the method moves to step 1311. Otherwise the method moves to step 1307. In step 1307, a determination may be made as to whether the identified object is an audio object in the television program. For example, a user may be watching AMC's "The Walking Dead" television program and may enter an input to learn more about a song being played in the episode. If the identified object in step 1303 is an audio object, the method moves to step 1311. Otherwise the method moves to step 1309. In step 1309, the identified object in step 1303 may be identified to be some other object, such as a place or clothing, or table/chair/sofa, etc.

In step 1311, the secondary content to output on the second computing device may be determined. In some examples, the secondary content may be based upon the identified object. For example, if the identified object in step 1303 is an individual, the secondary content may be determined to be other content that the individual is somehow affiliated with. The other content may be an advertisement for a movie in which the individual is an actor, an advertisement for a video programming content in which the individual is an actor, and/or an advertisement for a product the individual endorses. In still other examples the secondary content may be general information about the individual, such as a listing of television shows and movies that he has been in.

In step 1313, an actionable instruction may be transmitted to the second computing device by the first computing device. A web server, such as web server 313, in the first computing device may transmit the actionable instruction via a transmitter, such as transmitter 317. The actionable instruction may include data identifying the secondary content to be outputted on the second computing device, and/or an instruction to have the second computing device output content related to the identified object in the primary content, and/or other data. In step 1315, the second computing device may receive the actionable instruction. Such an example may be a tablet-style computer receiving the actionable instruction for a user's second screen experience. In step 1317, the secondary content may be outputted by the second computing device.

In accordance with at least one example, a last frame of the primary content, before a commercial marker is detected, may be analyzed to identify an object in the last frame in step 1303. In the example of a live sporting event, the broadcasting company may show a replay of the event before going to a commercial break. The replay may be of a baseball player hitting a home run. In a final frame before the commercial break, an image of the baseball player in uniform may be shown. In step 1303, the baseball cap of the player may be identified and the second screen experience for the user may have a website for a clothing retailer that sells the baseball cap. The secondary content may be the website of the clothing retailer which may be outputted on the second screen device of the user.

Figure 14:
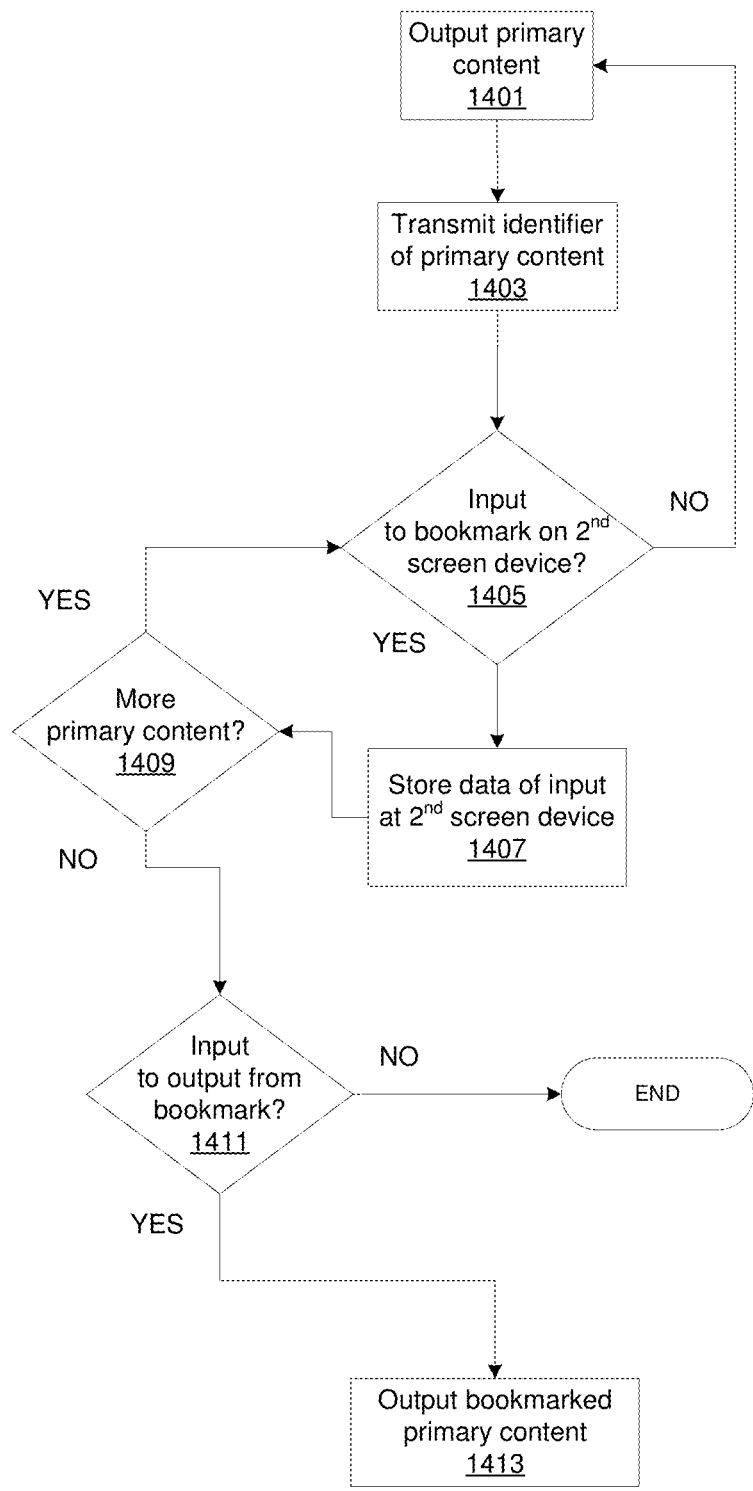
FIG. 14 illustrates an example method of bookmarking content for a second screen experience according to one or more illustrative aspects of the disclosure.

FIG. 14 illustrates an example method of bookmarking content for a second screen experience according to one or more illustrative aspects of the disclosure. Such an example may be a scenario where a viewer wants to bookmark a portion of the video programming content for use at a later time on a second computing device. FIG. 14 may be a scenario in which two computing devices are in communication. Although described with respect to two computing devices, in accordance with aspects described herein, more than two computing devices may be included and one or more steps of the method of FIG. 14 may be repeated and/or altered accordingly, for more computing devices. Some or all of the steps in the method of FIG. 14 may be performed by the computing device 200, 301A, 301B, 331. Specifically, for example, computer-executable instructions may be configured to implement the steps when executed by processor (s) of the computing device 200, 301A, 301B, 331.

In step 1401, content may be outputted by a first computing device, such as computing device 301A. For example, the first computing device is a set-top box and the content is video programming content of television program for do-it-yourself repairs. A viewer may be receiving a stream of the video programming content and the set-top box outputs the do-it-yourself repairs television program to a television. In step 1403, an identifier of the primary content may be transmitted to the second computing device, such as tablet-style computer 331. A web server, such as web server 313, in the first computing device may transmit the identifier via a transmitter, such as transmitter 317. The method may then proceed to step 1405. The primary content may be identified in some form. For example, in an example where the primary content is a video programming content, the identification of the primary content may include an episode number of the video programming content. The episode number may be an identifier of a particular episode of a particular season or an identifier of the actual number of the episode.

Utilizing a second computing device, in step 1405 a determination may be made as to whether an input to bookmark the primary content has been received on the second computing device. An example of an input to bookmark may be where the second computing device is a handheld smartphone and the input is an entry by the user via a two way touch screen interface system of the handheld smartphone. The user may want to bookmark a particular location within the primary content to come back to at a later time, such as when the user similarly is repairing something being taught on the do-it-yourself repairs television program. If no input to bookmark is received in step 1405, the method may return to step 1401. Otherwise, the method may proceed to step 1407.

In step 1407, data regarding the input to bookmark, received in step 1405, may be stored on the second computing device. Although not described in this example, data regarding the input to bookmark may be maintained in a memory storage in the first computing device, such as memory storage 321 and/or in a networked memory storage accessible via network interface 323 in computing device 301A. In step 1409, a determination may be made as to whether there is more primary content being outputted. Such a condition may be whether an end of television programming marker has been detected. If there is more primary content being outputted, the method returns to step 1405. Otherwise the method moves to step 1411.

In step 1411, a determination may be made as to whether an input has been received that indicates a request to output the bookmarked primary content. In an example a user may seek to access a reply of the primary content from a bookmarked location. The input may be received at the second computing device. If no input has been received in step 1411, the method may end. If an input has been received in step 1411, the method may proceed to step 1413 where the primary content may be outputted from the bookmarked location. The output of the bookmarked primary content may occur by the first or the second computing device. As such, a user may watch a do-it-yourself repair television program on how to fix a leaking faucet, bookmark the content at a particular sequence of the repair, and then perform the same repaid at home while watching a repair from the bookmarked location on a handheld smartphone. In the example of multiple bookmarks for the primary content, the input in 1411 may be for one of the bookmarks and to have the primary content replayed from that particular bookmark input. In an alternative example, the step of outputting the bookmarked video programming content may be outputted the bookmarked video programming content as a set of bookmark images of the video programming content.

Figure 15:
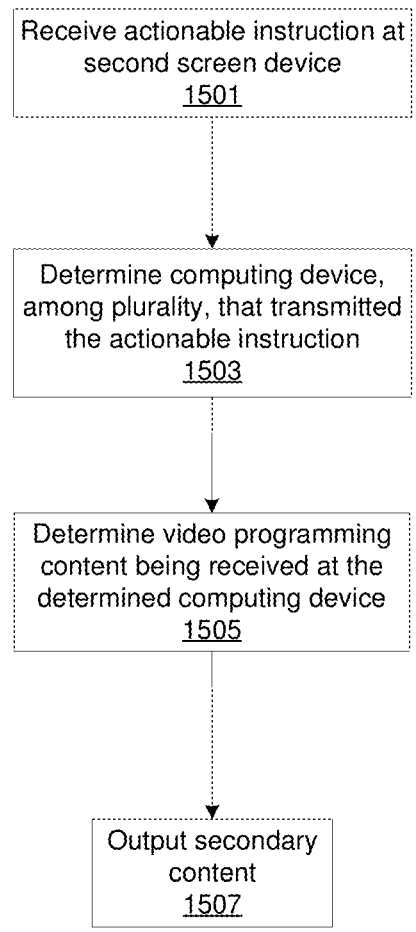
FIG. 15 illustrates an example method of identifying a second screen experience according to one or more illustrative aspects of the disclosure.

FIG. 15 illustrates an example method of identifying a second screen experience according to one or more illustrative aspects of the disclosure. In the example of FIG. 15, a computing device for a second screen experience may determine which computing device of a plurality of computing devices, is transmitting data for execution by the second computing device. FIG. 15 may be a scenario in which two or more computing devices are in communication. In accordance with aspects described herein, one or more steps of the method of FIG. 15 may be repeated and/or altered accordingly, for more computing devices. Some or all of the steps in the method of FIG. 15 may be performed by the computing device 200, 301A, 301B, 331. Specifically, for example, computer-executable instructions may be configured to implement the steps when executed by processor(s) of the computing device 200, 301A, 301B, 331.

In step 1501, an actionable instruction, transmitted by a first computing device, may be received by a second computing device, such as a handheld smartphone. A web server, such as web server 313, in the first computing device may transmit the actionable instruction via a transmitter, such as transmitter 317. The actionable instruction may include an actionable instruction to be initiated by the second computing device. For example, the actionable instruction may include an identifier of a trick play operation being requested on video programming content on the first computing device.

In step 1503, the second computing device may determine the computing device, among a plurality of computing devices, which transmitted the actionable instruction. In this example, the second computing device determines that the first computing device transmitted the actionable instruction. Step 1503 may include determining whether an identifier in the actionable instruction correlates to an action to be taken by the second computing device. Ion other examples step 1503 may include determining whether a code or other identifier in the actionable instruction identifies the first computing device.

In step 1505, video programming content being received at the determined first computing device may be determined. Step 1505 may include determining whether an identifier of a channel of video programming content being outputted on the determined first computing device is included in the actionable instruction received in step 1501. In other examples, an identification of the video programming content may be included in the actionable instruction received in step 1501. In step 1507, secondary content may be outputted by the second computing device based upon the determined video programming content being outputted on the first computing device.

Features of the present disclosure include systems and methods for controlling the rate of a second screen experience when a user desired to fast forward through an advertisement. A first computing device, such as a tablet style computer, may receive an identifier of a fast forward instruction to fast forward through an advertisement in video programming content, such as an episode of a television program, received at a second computing device, such as a set-top box. The identifier may be received from the set-top box. The identifier may comprise data representative of a rate of speed of the fast forward instruction. For example, fast forward instructions may be 2 times, 4 times, 8 times, or 16 times. The tablet style computer may determine a second advertisement to output the tablet style computer based upon the rate of speed of the fast forward instruction. Then the tablet style computer may output the second advertisement in accordance with the rate of speed of the fast forward instruction. In determining the second advertisement, the system may identify that the rate of speed of the fast forward instruction is above a threshold value a slate of static advertisements may be determined as the second advertisement. In another example, in determining the second advertisement, the system may time sync the second advertisement with the rate of speed of the fast forward instruction. In an example, in determining the second advertisement, the system may access a table correlating advertisements to rate of speeds of fast forward instructions, and the second advertisement may be identified from the table that corresponds to the rate of speed of the fast forward instruction.

Additional features of the present disclosure include systems and methods for swapping the location of advertisements during video programming. A first computing device, such as a handheld smartphone, may receive an identifier of an instruction to change a set of advertisements in video programming content received at a second computing device to another set of advertisements for output on the handheld smartphone. The second computing device may be a set-top box and the identifier may be received form the set-top box. The handheld smartphone may determine the other set of advertisements to output on the handheld smartphone based upon the instruction to change, and the other set of advertisements may be outputted on the handheld smartphone. In some illustrative examples, the identifier of the instruction to change the set of advertisements may be an identifier of a fast forward instruction via the set of advertisements in video programming content received at the set-top box. In other examples, the identifier of the instruction to change the set of advertisements may comprise a length of time of the set of advertisements and in determining the other set of advertisements, the system may determine the other set of advertisements based upon the length of time of the first set of advertisements. In still other examples, in another example of determining the other set of advertisements, the system may determine the other set of advertisements based upon a rate of speed of an instruction to fast forward through the original set of advertisements.

Additional features of the present disclosure include systems and methods for allowing fast forwarding through advertisements during video programming if an alternative device is in operation to show an alternative advertisement. A first computing device, such as a set-top box, may receive a fast forward instruction. Such an instruction may be too fast forward through a first advertisement in video programming content received at the set-top box. Upon determining that a second computing device, such as a tablet-style computer that is external to the set-top box, is in operation to display an alternative advertisement on the tablet-style computer, the set-top box may permit the fast forwarding through the first advertisement and transmit an actionable instruction to the tablet-style computer to output the alternative advertisement. The actionable instruction may include a duration of time for outputting the alternative advertisement, and the duration of time may correlate to a rate of speed of the fast forward instruction. In other examples, upon determining that the tablet-style computer is not in operation to display the alternative advertisement on the tablet-style computer, the set-top box may prevent the fast forwarding through the first advertisement. In still other examples, the system may permit the fast forwarding through the first advertisement at a rate of speed based upon a duration of time of the alternative advertisement.

Additional features of the present disclosure include systems and methods for logging into a second screen experience. A first computing device, such as a set-top box, may receive data representative of a user logging into a program on a second computing device that interacts with the set-top box. The second computing device may be a handheld smartphone that is external to the set-top box. Responsive to a determination that the set-top box is not receiving video programming content, the set-top box automatically may tune a receiver to receive video programming content. Then the set-top box may transmit an actionable instruction to the handheld smartphone identifying the television programming content being received by the set-top box. In some examples the program may be an application program. In some examples, the actionable instruction may include an instruction to output content related to the video programming content on the handheld smartphone. In still other examples, the system may determine that the receiver is not powered on, and the automatically tuning the receiver may include powering on the receiver.

Additional features of the present disclosure include systems and methods for syncing later play of recorded content for a second screen experience. A first computing device, such as a tablet-style computer, may receive an identifier of an actionable instruction to play previously recorded primary content at a second computing device, such as a set-top box. The identifier may be received from the set-top box. Secondary content to output on the tablet-style computer may be determined by the set-top box based upon the actionable instruction. Then the secondary content may be outputted on the tablet-style computer. The secondary content may be time stamped secondary content and the system may time sync the time stamped secondary content to a time of playing the previously recorded primary content. The secondary content may be content from a social media feed recorded at a time of recording the primary content and the system may time sync the content from the social media feed as recorded to the time of playing the previously recorded primary content. In some examples, the content from the social media feed may be content from a social media feed of a producer of the primary content. In still other examples, the secondary content may be content from a social media feed captured at a time of recording the primary content and the system may receive the content from the social media feed from a storage device of the second set-top box. In further examples, the system may sync the content from the social media feed as recorded to the time of playing the previously recorded primary content.

Additional features of the present disclosure include systems and methods for retrieving secondary content for a second screen experience. A first computing device, such as a set-top box, may receive a request to play recorded primary content. An actionable instruction may be transmitted to a second computing device, such as a tablet-style computer external to the set-top box, in response to the received request. Such an actionable instruction may include an instruction to have the tablet-style computer receive secondary content from the set-top box or a networked storage device based upon a determination of whether the secondary content is maintained in the set-top box. The system may determine whether the secondary content, to be outputted by the tablet-style computer concurrently with the recorded primary content outputted by the set-top box, is maintained in the set-top box. The secondary content may be content from a social media feed recorded at a time of recording the primary content. In some examples, the actionable instruction may include an instruction to time sync the content from the social media feed as recorded to the time of playing the recorded primary content. In some examples, the set-top box may record the primary content. In other examples, the secondary content may include a first portion of secondary content and a second portion of secondary content, and the actionable instruction may include a first instruction to have the tablet-style computer receive the first portion of secondary content from the set-top box and a second instruction to have the tablet-style computer receive the second portion of secondary content from the networked storage device.

Additional features of the present disclosure include systems and methods for restricting advertisements for a second screen experience. A first computing device, such as a set-top box, may receive primary content. The set-top box may determine secondary content to be outputted by a second computing device, such as a handheld smartphone, based upon an identification of the primary content. Then the set-top box may transmit an actionable instruction to the handheld smartphone to configure the handheld smartphone to output the determined secondary content. The primary content may be video programming content and the identification of the primary content may include an episode number of the video programming content. The secondary content may include an advertisement for a different episode number of the video programming content. In other examples, the episode number of the primary content may include a season number and the secondary content may include an advertisement for a later season of the video programming content. In still other examples, the system may prevent the secondary content from being an advertisement for a later episode of the video programming content. In some examples, the secondary content may be an advertisement, the primary content may be an episode of a video programming content, and the system may prevent the advertisement from being an advertisement for any episode of the video programming content.

Additional features of the present disclosure include systems and methods for dynamic advertisements for a second screen experience. A first computing device, such as a set-top box, may receive primary content. Secondary content to be outputted by a second computing device, such as a tablet-style device, may be determined based upon an object in the primary content. An actionable instruction may be transmitted to the tablet-style computer to configure the tablet-style computer to output the determined secondary content. The object may be a visual object, an audio object, or a combination of the two. In some examples, the object may be an individual, the secondary content may be an advertisement, and the system may identify the individual in the primary content. The advertisement comprises an advertisement for a movie in which the individual is an actor, an advertisement for a video programming content in which the individual is an actor, and/or an advertisement for a product the individual endorses. In some examples, the object may be in a last frame of the primary content before an advertisement.

Additional features of the present disclosure include systems and methods for utilizing visual bookmarks in programming for a second screen experience. A first computing device, such as a handheld smartphone, may receive an identifier of video programming content being outputted on a second computing device, such as a set-top box. An input to bookmark a portion of the video programming content may be received at the handheld smartphone. Data representative of the bookmark may be stored on the handheld smartphone. Then an instruction to output the video programming content from the bookmark may be received. The system may receive an instruction to output the video programming content on the handheld smartphone. In some examples, the system may receive data representative of an input from a remote control of the set-top box. In other examples, the system may receive an instruction to output the video programming content as a set of bookmark images of the video programming content.

Additional features of the present disclosure include systems and methods for identifying a particular computing device to synchronize a second screen experience. A first computing device, such as a tablet-style computer, may receive an actionable instruction to be initiated by the tablet-style computer. The tablet-style computer may determine a second computing device of a plurality of computing devices that transmitted the actionable instruction. The second computing device may be a set-top box. Video programming content being received at the set-top box may be determined, and content may be outputted on the tablet-style computer based upon the determined video programming content. In some example, the system may receive an identifier of a channel of video programming content being outputted on the set-top box. In other examples, the system may determine whether an identifier in the actionable instruction correlates to an action to be taken by the tablet-style computer. In still other examples, the actionable instruction may include a trick play operation on the video programming content on the set-top box.

The various features described above are merely non-limiting examples, and can be rearranged, combined, subdivided, omitted, and/or altered in any desired manner. For example, features of the computing device (including the remote control device and the terminal device) described herein can be subdivided among multiple processors and computing devices. The true scope of this patent should only be defined by the claims that follow.

The invention claimed is:

1. A method comprising:
receiving, by a first computing device, an indication that a second computing device has accessed an application that interacts with the first computing device;
causing, based on the indication that the second computing device has accessed the application and based on an indication that the first computing device is available, output of content by the first computing device;
receiving, by the first computing device, a request to fast-forward through at least a portion of the content being output by the first computing device;
sending, based on the request, instructions to output second content on the second computing device and to disable a trick play operation on the second content; and
fast-forwarding through the at least the portion of the content being output by the first computing device.

2. The method of claim 1, wherein the first computing device comprises a set-top box and the second computing device comprises a mobile phone.

3. The method of claim 1, wherein the receiving the request comprises receiving data indicating an input, at a remote control device, of a fast-forward command,
wherein the instructions to output the second content and to disable the trick play operation on the second content are based on a table correlating inputs received at the remote control device to instructions to be sent to the second computing device.

4. The method of claim 1, wherein the content being output by the first computing device comprises advertisement content, and wherein the second content comprises alternative advertisement content different from the advertisement content.

5. The method of claim 1, wherein the content being output by the first computing device comprises an advertisement.

6. The method of claim 1, wherein the indication that the second computing device has accessed the application that interacts with the first computing device comprises an indication that the second computing device is available for output.

7. The method of claim 1, wherein the second computing device comprises a mobile computing device comprising a remote control device of the first computing device.

8. The method of claim 1, further comprising:
selecting, based on a duration of the second content, a speed at which to fast-forward through the at least the portion of the content being output by the first computing device.

9. The method of claim 1, further comprising:
pausing, based on receiving information indicating that a user viewing the content being output by the first computing device has left a proximity of the first computing device, the content being output by the first computing device.

10. The method of claim 1, wherein the sending the instructions to output second content comprises:
sending, to a third computing device and based on the request, the instructions to output the second content on the second computing device and to disable the trick play operation on the second content.

11. One or more non-transitory computer-readable media storing instructions that, when executed, cause:
receiving, by a first computing device, an indication that a second computing device has accessed an application that interacts with the first computing device;
causing, based on the indication that the second computing device has accessed the application and based on an indication that the first computing device is available, output of content by the first computing device;
receiving, by the first computing device, a request to fast-forward through at least a portion of the content being output by the first computing device;
sending, based on the request, instructions to output second content on the second computing device and to disable a trick play operation on the second content; and
fast-forwarding through the at least the portion of the content being output by the first computing device.

12. The one or more non-transitory computer-readable media of claim 11, wherein the first computing device comprises a set-top box and the second computing device comprises a mobile phone.

13. The one or more non-transitory computer-readable media of claim 11, wherein the receiving the request comprises receiving data indicating an input, at a remote control device, of a fast-forward command,
wherein the instructions to output the second content and to disable the trick play operation on the second content are based on a table correlating inputs received at the remote control device to instructions to be sent to the second computing device.

14. The one or more non-transitory computer-readable media of claim 11, wherein the content being output by the first computing device comprises advertisement content, and wherein the second content comprises alternative advertisement content different from the advertisement content.

15. The one or more non-transitory computer readable media of claim 11, wherein the content being output by the first computing device comprises an advertisement.

16. The one or more non-transitory computer readable media of claim 11, wherein the indication that the second computing device has accessed the application that interacts with the first computing device comprises an indication that the second computing device is available for output.

17. The one or more non-transitory computer-readable media of claim 11, wherein the second computing device comprises a mobile computing device comprising a remote control device of the first computing device.

18. The one or more non-transitory computer-readable media of claim 11, wherein the instructions, when executed further cause:
selecting, based on a duration of the second content, a speed at which to fast-forward through the at least the portion of the content being output by the first computing device.

19. The one or more non-transitory computer readable media of claim 11, wherein the instructions, when executed further cause:
pausing, based on receiving information indicating that a user viewing the content being output by the first computing device has left a proximity of the first computing device, the content being output by the first computing device.

20. The one or more non-transitory computer readable media of claim 11, wherein the sending the instructions to output second content comprises:
sending, to a third computing device and based on the request, the instructions to output the second content on the second computing device and to disable the trick play operation on the second content.

21. An apparatus comprising:
one or more processors; and
memory storing instructions that, when executed by the one or more processors, cause the apparatus to:
receive, by a first computing device, an indication that a second computing device has accessed an application that interacts with the first computing device;
cause, based on the indication that the second computing device has accessed the application and based on an indication that the first computing device is available, output of content by the first computing device;
receive, by the first computing device, a request to fast-forward through at least a portion of the content being output by the first computing device;
send, based on the request, instructions to output second content on the second computing device and to disable a trick play operation on the second content; and
fast-forward through the at least the portion of the content being output by the first computing device.

22. The apparatus of claim 21, wherein the first computing device comprises a set-top box and the second computing device comprises a mobile phone.

23. The apparatus of claim 21, wherein the receiving the request comprises receiving data indicating an input, at a remote control device, of a fast-forward command,
wherein the instructions to output the second content and to disable the trick play operation on the second content are based on a table correlating inputs received at the remote control device to instructions to be sent to the second computing device.

24. The apparatus of claim 21, wherein the content being output by the first computing device comprises advertisement content, and wherein the second content comprises alternative advertisement content different from the advertisement content.

25. The apparatus of claim 21, wherein the content being output by the first computing device comprises an advertisement.

26. The apparatus of claim 21, wherein the indication that the second computing device has accessed the application that interacts with the first computing device comprises an indication that the second computing device is available for output.

27. The apparatus of claim 21, wherein the second computing device comprises a mobile computing device comprising a remote control device of the first computing device.

28. The apparatus of claim 21, wherein the instructions, when executed by the one or more processors, further cause the apparatus to:
select, based on a duration of the second content, a speed at which to fast-forward through the at least the portion of the content being output by the first computing device.

29. The apparatus of claim 21, wherein the instructions, when executed by the one or more processors, further cause the apparatus to:
pause, based on receiving information indicating that a user viewing the content being output by the first computing device has left a proximity of the first computing device, the content being output by the first computing device.

30. The apparatus of claim 21, wherein the sending the instructions to output second content comprises:
sending, to a third computing device and based on the request, the instructions to output the second content on the second computing device and to disable the trick play operation on the second content.

31. A system comprising:
a first computing device and a second computing device, wherein, the first computing device comprises:
one or more processors; and
memory storing instructions that, when executed by the one or more processors, cause the first device to:
receive, an indication that the second computing device has accessed an application that interacts with the first computing device;
cause, based on the indication that the second computing device has accessed the application and based on an indication that the first computing device is available, output of content by the first computing device;
receive, by the first computing device, a request to fast-forward through at least a portion of the content being output by the first computing device;
send, based on the request, instructions to output second content on the second computing device and to disable a trick play operation on the second content; and
fast-forward through the at least the portion of the content being output by the first computing device.

32. The system of claim 31, wherein the first computing device comprises a set-top box and the second computing device comprises a mobile phone.

33. The system of claim 31, wherein the receiving the request comprises receiving data indicating an input, at a remote control device, of a fast-forward command, wherein the instructions to output the second content and to disable the trick play operation on the second content are based on a table correlating inputs received at the remote control device to instructions to be sent to the second computing device.

34. The system of claim 31, wherein the content being output by the first computing device comprises advertisement content, and wherein the second content comprises alternative advertisement content different from the advertisement content.

35. The system of claim 31, wherein the content being output by the first computing device comprises an advertisement.

36. The system of claim 31, wherein the indication that the second computing device has accessed the application that interacts with the first computing device comprises an indication that the second computing device is available for output.

37. The system of claim 31, wherein the second computing device comprises a mobile computing device comprising a remote control device of the first computing device.

38. The system of claim 31, wherein the instructions, when executed by the one or more processors, further cause the first device to:
select, based on a duration of the second content, a speed at which to fast-forward through the at least the portion of the content being output by the first computing device.

39. The system of claim 31, wherein the instructions, when executed by the one or more processors, further cause the first device to:
pause, based on receiving information indicating that a user viewing the content being output by the first computing device has left a proximity of the first computing device, the content being output by the first computing device.

40. The system of claim 31, wherein the sending the instructions to output second content comprises:
sending, to a third computing device and based on the request, the instructions to output the second content on the second computing device and to disable the trick play operation on the second content.

* * * * *